United States Patent
Couckuyt et al.

(10) Patent No.: US 7,054,745 B1
(45) Date of Patent: May 30, 2006

(54) METHOD AND SYSTEM FOR GENERATING DRIVING DIRECTIONS

(75) Inventors: Jeffrey Darren Couckuyt, Bothell, WA (US); Amos Dylan Vance, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 10/654,229

(22) Filed: Sep. 3, 2003

(51) Int. Cl.
*G01C 21/30* (2006.01)

(52) U.S. Cl. .................. 701/211; 701/209; 340/995.27

(58) Field of Classification Search ............ 701/23–25, 701/200–213; 340/989–995.28; 342/357.1, 342/357.06
See application file for complete search history.

(56) References Cited

U.S. PATENT DOCUMENTS

| | | | |
|---|---|---|---|
| 6,236,935 B1 | 5/2001 | Helmstadter et al. | |
| 6,490,522 B1* | 12/2002 | Sugiyama et al. | 701/211 |
| 6,567,745 B1 | 5/2003 | Fuchs et al. | |
| 6,581,003 B1* | 6/2003 | Childs et al. | 701/209 |
| 6,609,063 B1* | 8/2003 | Bender et al. | 701/209 |
| 6,675,093 B1* | 1/2004 | Childs et al. | 701/209 |
| 6,678,611 B1* | 1/2004 | Khavakh et al. | 701/210 |
| 6,775,612 B1* | 8/2004 | Kao et al. | 701/209 |
| 6,789,012 B1* | 9/2004 | Childs et al. | 701/209 |
| 6,856,900 B1* | 2/2005 | Childs et al. | 701/209 |
| 2002/0103599 A1* | 8/2002 | Sugiyama et al. | 701/211 |

OTHER PUBLICATIONS

MapQuest website; MapQuest: Driving Directions: North America; copyright 2003 MapQuest.com, Inc.; http://www.mapquest.com/directions/.

MapQuest website; MapQuest: Driving Directions: North America; Driving Directions between DeKalb Peachtree Airport and Kennesaw Civil War Museum; copyright 2003 MapQuest.com, Inc.; output from website listed as reference AP of this page.

ViaMichelin website; city maps, itinerary, route planner, road maps; copyright 2001 Michelin; http://www.viamichelin.com/viamichelin/gbr/dyn/controller/CityToCity Search; jsessionid=0000BAQ3FVRUOSKYUR05L1QAKSQ+ ud67akit.

ViaMichelin website; ViaMichelin—Driving Directions; itinerary between Hamburg and Paris; copyright 2001 Michelin; output from website listed as reference AS of this form.

Yahoo! website; Yahoo! Maps and Driving Directions; copyright 2003 Yahoo! Inc.; http://maps.yahoo.com/py/ddResults.py?Pyt=Tmap.

(Continued)

*Primary Examiner*—Richard M. Camby
(74) *Attorney, Agent, or Firm*—Merchant & Gould

(57) ABSTRACT

A method and system for generating driving directions composes computer-based instructions that emulate a human driving perspective. Language-based instructions guide a driver along a route that encompasses a sequence of roads and intersections. An algorithm applies rules based on human perception to route components. The algorithm diagnoses road name changes so that instructions are clear and concise. The algorithm analyzes road and intersection geometry at confusing areas, such as road forks, roundabouts, ferry crossings, cloverleaf interchanges, and ramps, to generate instructions that conform to a driver's natural perspective. The algorithm analyzes the configuration of an intersection with respect to a driver's field of view to compose a clear and concise instruction. When appropriate, the algorithm produces compound instructions for adjacent intersections.

7 Claims, 12 Drawing Sheets

OTHER PUBLICATIONS

Yahoo! website; Yahoo! Maps—Directions to Stone Mountain, GA; Directions starting from ATL, Atlanta, GA and Arriving at Stone Mountain, GA; copyright 2003 Yahoo! Inc.; output from website listed as reference AU of this form.
Rand McNally website; copyright 2003 randmcnally.com inc.; http://www.randmcnally.com/rmc/directions/dirGetDirectionsInput.jsp?BV_SessionID=@@@@0361101590.1057856914@@@@&BV_EngineID=cccdadcikgllhlecgencfhjdfiidfin.0&cmty=0.
Rand McNally website; Rand McNally—Get Directions; copyright 2003 randmcnally.com inc; Atlanta Harstfield Airport Atlanta, GA to Stone Mountain, GA; output from website listed as reference AW of this form.
Press Release, "New Alpine Components Give Consumers Many Options for Building the Industry's Leading Mobile Navigation System," Torrance, Calif., Jan. 8, 2002, Alpine Electronics of American, Inc.
Press Release, "Alpine Makes It Easier to Experience Industry's Leading In-vehicle Navigation System with New System/Monitor Package," Torrance, Calif., Jan. 9, 2003, Alpine Electronics of America, Inc.
Wrolstad, Jay, "IBM Teams with Honda on Telematics," Wireless NewsFactor, Jul. 29, 2002; http://www.wirelessnewsfactor.com/perl/story/18791.html.
DeLorme software product description posted on website; DeLorme Street Atlas USA 2003; copyright 2003 DeLorme; http://www.delorme.com/streetatlas2003/default.asp.
Microsoft software product description posted on website; Microsoft AutoRoute; copyright 2003 Microsoft Corporation; http://www.microsoft.com/autoroute.
Microsoft software product description posted on website; Streets and Trips 2003; copyright 2003 Microsoft Corporation; http://www.microsoft.com/streets/mappoint/.
Microsoft website; Microsoft MapPoint Web Service; copyright 2003 Microsoft Corporation; http://www.microsoft.com/mappoint/net/.
Microsoft website; MSN Maps & Driving Directions—Get Directions; copyright 2003 Microsoft Corporation; http://mappoint.msn.com/(0pdhanbe4altde55rsstviq1)/directionsfind.aspx?&src=MP&cnty2=0.
Microsoft website; MSN Maps & Directions—Directions Print; copyright 2003 Microsoft Corporation; Maps and Directions Start: Atlanta, Georgia end Stone Mountain, Georgia; output from website listed as reference BF of this page.
Acura MDX Navigation System user manual copyright 2000 Honda Motor Co. Ltd. Tokyo, Japan.

* cited by examiner

METHOD AND SYSTEM FOR GENERATING DRIVING DIRECTIONS

TECHNICAL FIELD

The present invention relates to generating driving directions with computer algorithms. More specifically, it relates to computer-generated driving directions that emulate a human driver's perspective when providing multiple driving instructions in a sequence to reach a destination.

BACKGROUND OF THE INVENTION

Travelers take a variety of approaches to navigate between a trip's origin and destination. In one of the most basic approaches, a driver carries a conventional map as a navigation aid and references the map during the trip. Many people find the graphic content of a map, which is presented from a bird's-eye perspective, unfamiliar and cumbersome. Others are overwhelmed by too much information or find the print is too small.

Either as a supplement for a map or as a replacement, a person who is familiar with a route often composes driving instructions from memory and communicates them to a driver. The driver uses a written copy of the instructions as a guide to following the route. People who have driven a route tend to compose instructions that are aligned with the natural driving perspective. Good directions or driving instructions describe intersections concisely, accurately, and without prolix. If a route for a given set of driving instructions crosses an intersection that a driver would naturally ignore, a good set of driving instructions tend not to provide any extraneous instructions or description for that intersection. For example, a good set of driving instructions usually would not describe ten roads that intersect a route over a short distance such as a quarter mile prior to a turn instruction.

Good driving instructions usually attempt to match a driver's perspective. Drivers tend to perceive intersections and route components in relation to other elements in their field of view. Since people who give directions or driving instructions are often drivers themselves, they tend to describe intersections in a context aligned to a driver's forward-viewing perspective. For example, to guide a driver through an intersection with complex road geometry, a person tends to describe a route to a destination based on its geometric orientation relative to another intervening road.

In certain circumstances when a segment of a route includes two intersections in close proximity to one another, a driver may perceive the intersections as one integrated route component. People who provide driving directions or instructions tend to intuitively recognize the underlying conditions and, when appropriate, provide a single instruction to guide a driver through both intersections.

While the human based approach to navigation has benefits, it has significant limitations. In many cases, a driver simply cannot access anyone with familiarity of a route or a particular destination. And while human based driving instructions are usually the easiest to follow by a driver, frequently humans can remember or describe routes inaccurately. Human-generated instructions can be susceptible to human error. And, since individual perception is subjective, the quality and consistency of human-generated instructions can vary greatly.

As an alternative to the human based driving directions or instructions, computers can routinely generate driving instructions via conventional technologies. Commercial sources, including Internet websites and stand-alone software packages, offer a driver a list of instructions, or a driving itinerary, between one location and another. Conventional computer-generated driving instructions are generally more consistent than human-generated instructions. And with the recent proliferation of mobile computing and Internet technologies, computer-generated driving instructions are reasonably accessible in many driving situations.

Computers conventionally derive driving directions from commercially available databases that contain the geographic location of roads and intersections in a region. For each road, the database identifies name, type, speed limit, allowable direction of travel, and turn restrictions. "Shape points" identify the path of a road between "nodes," such as an intersection, state line, name change, or other defining feature.

Conventional mapping software generates a route between user-selected start and destination points by processing the commercial database. The software typically displays a route by highlighting it on a traditional map and displaying the highlighted map through a user interface. To accompany the map, conventional software can generate textual driving instructions with what can be referred to as an itinerary module. Conventional itinerary modules process the route rather than the database per se.

While conventional mapping software is frequently accessible and generally produces consistent directions, its instructions differ from those of a human instruction giver. Conventional computer-generated driving instructions typically lack the natural, human perspective of a driver. Conventional computer software may output unneeded instructions at intersections that an ordinary driver could navigate solely on the basis of a natural driving perspective. Extraneous instructions may not be helpful to a driver. Furthermore, conventional software may not output needed instructions for confusing intersections that an ordinary driver could not readily navigate on the sole basis of natural driving perspective. The software also may output a series of choppy instructions to describe closely spaced intersections.

A driver attempting to navigate a route by following such instructions may not have time between each intersection to read each instruction. Furthermore, conventional computer-generated driving instructions do not typically emulate natural human language. The language may be choppy, overly wordy, or structurally confusing. Such language can distract a driver attempting to navigate a route in busy traffic on unfamiliar roadways.

In many instances, it would be desirable to provide driving directions with the positive attributes of both human-generated and computer-generated directions, but without the negative attributes of either. Accordingly, there is a need in the art for a computer-based method and system for generating clear, concise driving instructions that emulate natural language and conform to the human driving perspective.

SUMMARY OF THE INVENTION

The present invention can include a method and system for generating driving directions. The driving directions can emulate a human driver's perspective when providing multiple driving instructions in a sequence to reach a destination. A computer, such as a personal computer or Internet server, can generate instructions via a computer program. The program can include rules and can be stored on a computer-readable medium such as a hard drive, a portable magnetic disk, or an optical disk.

According to one aspect, the present invention can adapt instructions to conform to a driver's natural driving perspective. The language of an instruction output by the present invention can be concise, accurate, and similar to a direction that another human would provide to a driver as a guide to follow a driving route. The present invention can generate user-friendly instructions by categorizing driving situations according to a human driver perspective.

According to another aspect, the present invention can generate a single instruction that effectively guides a driver to enter a roundabout on one road and exit the roundabout on another road. The present invention can also generate a single instruction that effectively guides a driver through entering a clover leaf on one interstate highway, traversing the cloverleaf's ramp system, and exiting the cloverleaf onto another highway.

According to one aspect of the present invention, a computer program can combine the instructions of two adjacent intersections into a single, combined instruction that guides a driver through both intersections. The computer program can output a combined instruction conditionally, if, based on the configuration of two intersections, a human driver would naturally perceive the two intersections as a single, integrated feature of a driving route. The computer program can generate combined instructions by analyzing and processing components of a route with successive iterations.

A first processing iteration can determine if a node or intersection is a candidate for a written instruction. A second processing iteration can combine two of these candidate instructions into a single, merged instruction, if the two candidate instructions meet all criteria for a combined instruction.

According to another aspect of the present invention, a computer program can analyze an intersection according to a driver's natural perspective and output an instruction tailored to that perspective. An intersection can include an entry road, an exit road and at least one intervening road. If a driver would naturally ignore the intervening road due to its size or due to the intersection geometry, the present invention can suppress outputting an instruction for the intersection.

If the entry road and the exit road have the same name and are components of the road, and the geometry of the intersection is such that a driver might be naturally inclined to take the wrong, intervening road, the present invention can recognize the potential confusion and output an instruction for the intersection. The present invention can also analyze the intersection according to human driver perspective by comparing the geometry or heading of the intervening road relative to the exit road. Software can generate a tailored driving instruction based on the analysis.

The discussion of generating driving directions presented in this summary is for illustrative purposes only. Various aspects of the present invention may be more clearly understood and appreciated from a review of the following detailed description of the disclosed embodiments and by reference to the drawings and claims.

DETAILED DESCRIPTION OF EXEMPLARY EMBODIMENTS

Introduction

A method and system for generating driving directions along a route allows a driver to follow the route with concise and accurate directions. The directions emulate natural language and sound like they were written or spoken by a human, rather than a machine. The directions also conform to a driver's natural driving perspective. If a driver would naturally perceive one or more intersections according to a certain perspective, then the directions follow that perspective. If a driver would tend to ignore a road intersecting the route and the road is irrelevant to the route, then the directions do not include an extraneous description of that intersection. If two intersections are configured such that a driver would perceive the two intersections as one feature or a driver would not have time between the intersections to absorb two directions, then the directions include a single, compound instruction that describes both intersections.

The process for generating driving directions can include processing a route in two passes. The first pass generates instructions that are specific to each intersection. The second pass combines instructions for adjacent intersections, if a combination is appropriate.

The process can alternatively include processing a route in stepwise segments. The process steps through nodes of the route analyzing each node in conjunction with at least one adjacent node. If two adjacent nodes are preferentially described by a single instruction, then the process outputs a single instruction that describes both intersections.

Turning now to the drawings, in which like numerals indicate like elements throughout the several figures, an exemplary operating environment and an exemplary embodiment of the present invention will be described in detail.

Exemplary Operating Environment

Figure 1:
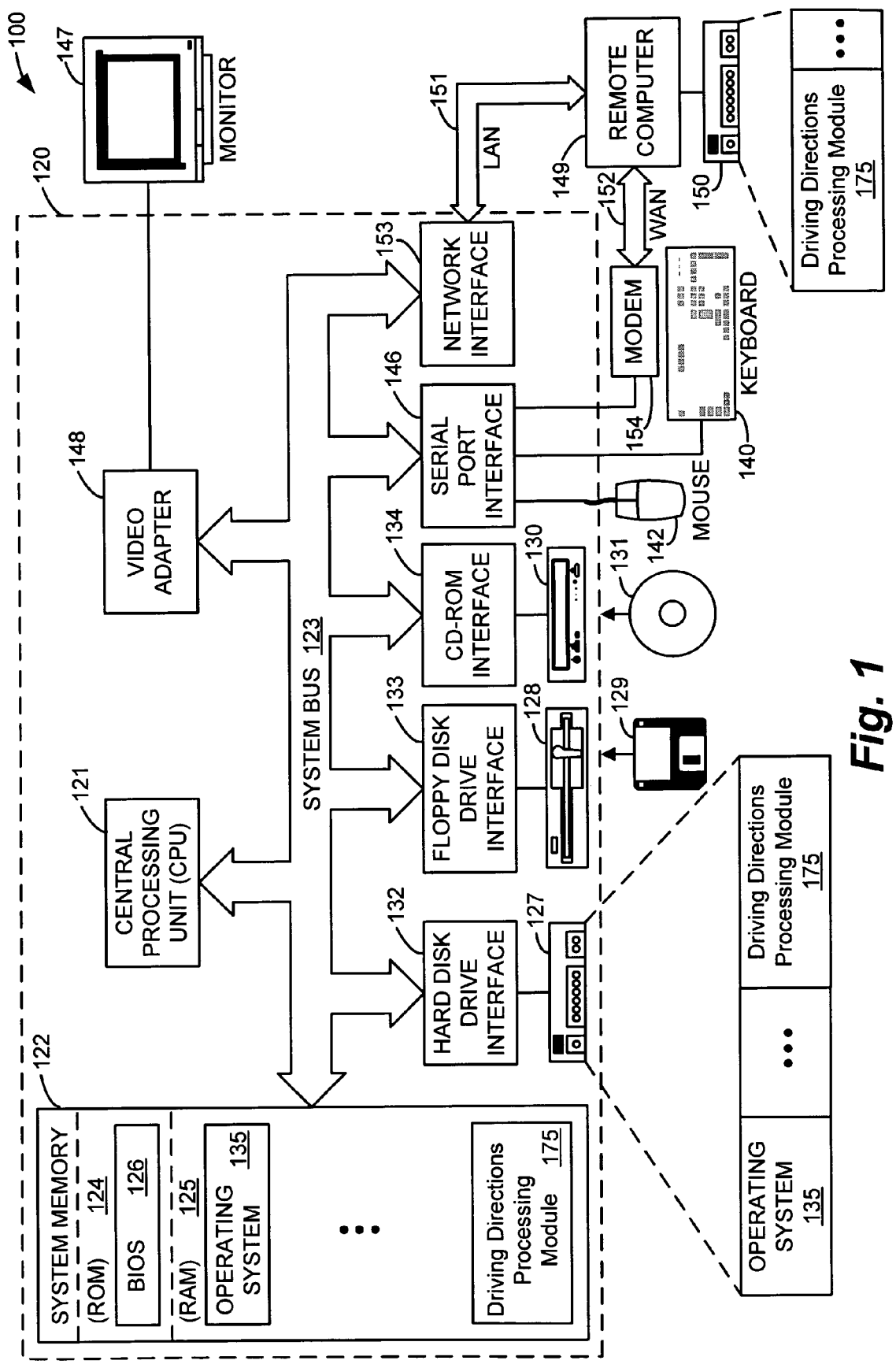
FIG. 1 is a functional block diagram illustrating an exemplary operating environment for implementing various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention.

The exemplary operating environment includes a general-purpose computing device in the form of a conventional personal computer 120, as exemplified by the architectural overview in FIG. 1. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135 and a driving directions processing module 175. Program modules include routines, sub-routines, programs, objects, components, data structures, etc., which perform particular tasks or implement particular abstract data types. Aspects of the present invention may be implemented in the form of a driving directions processing module 175.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network personal computer, a peer device, or other common network node. While a remote computer 149 typically includes many or all of the elements described above relative to the personal computer 120, only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other apparatus for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other provisions for establishing a communications link between the computers may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

Process and components of an exemplary embodiment of the present invention will now be described in reference to FIGS. 5–7. The present invention includes multiple computer programs which embody the functions described herein and illustrated in the exemplary display screens and the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example.

Therefore, disclosure of a particular set of program code instructions is not considered necessary for an adequate understanding of how to make and use the invention. The inventive functionality of the claimed computer program will be explained in more detail in the following description in conjunction with the remaining Figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Exemplary Route

Figure 2A:
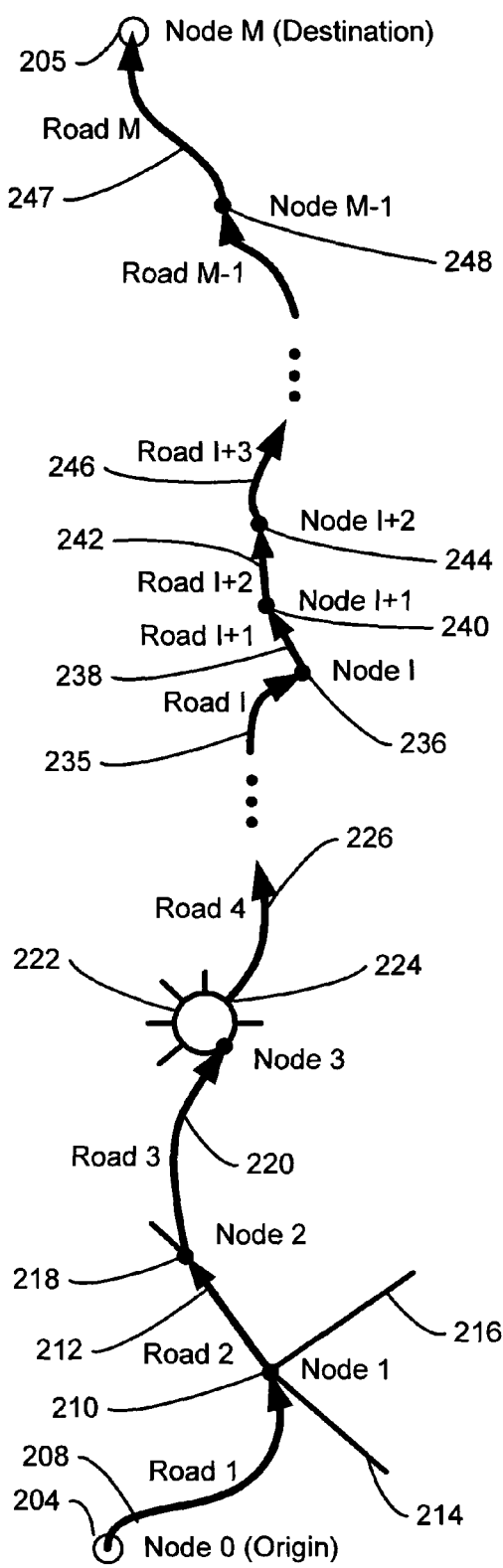
FIG. 2A illustrates an exemplary route between an origin and a destination connected together by a series of roads and intersections for generating driving directions by an exemplary embodiment of the present invention.

FIG. 2A is an illustration of an exemplary route 200 between an origin 204 and a destination 205 connected together by a series of road and intersections, or nodes. The route has a quantity of M+1 nodes and M roads. Although not specifically identified in FIG. 2A the present invention can process routes 200 that include a wide variety of nodes and route components such as water crossings, along-the-route over-night stays, waypoints, interstate cloverleaf interchanges, detours, side trips, and road-name-changes points. The term "node," as used herein, has an equivalent meaning to the term "intersection" and the terms are used interchangeably herein.

A driver begins driving at the origin 204, node 0, by driving on road 1 208 until reaching node 1 210. Node 1 is a four-way intersection between road 1 208, road 2 212 and two intervening roads 214, 216. At node 1 210, the driver takes road 2 212 to the next intersection (node 2) 218, which is a fork. The driver takes the right prong of the fork, road 3 220, to a roundabout 222. The driver traverses the roundabout 222 traveling counterclockwise and takes the second exit 224 onto the next road 226. The route 200 includes arbitrary road 1235 leading into arbitrary node I 236. Road I+1 238 leads out of node I 236 to node I+1 240. Road 1+2 242 leads out of node I+1 240 to node I+2 244. Road I+3 246 leads out of node I+2 244 towards the destination 205. At the destination-end of the route 205, road M 247 connects node M−1 248 to the destination 205, node M.

Exemplary Process for Generating an Itinerary

Figure 2B:
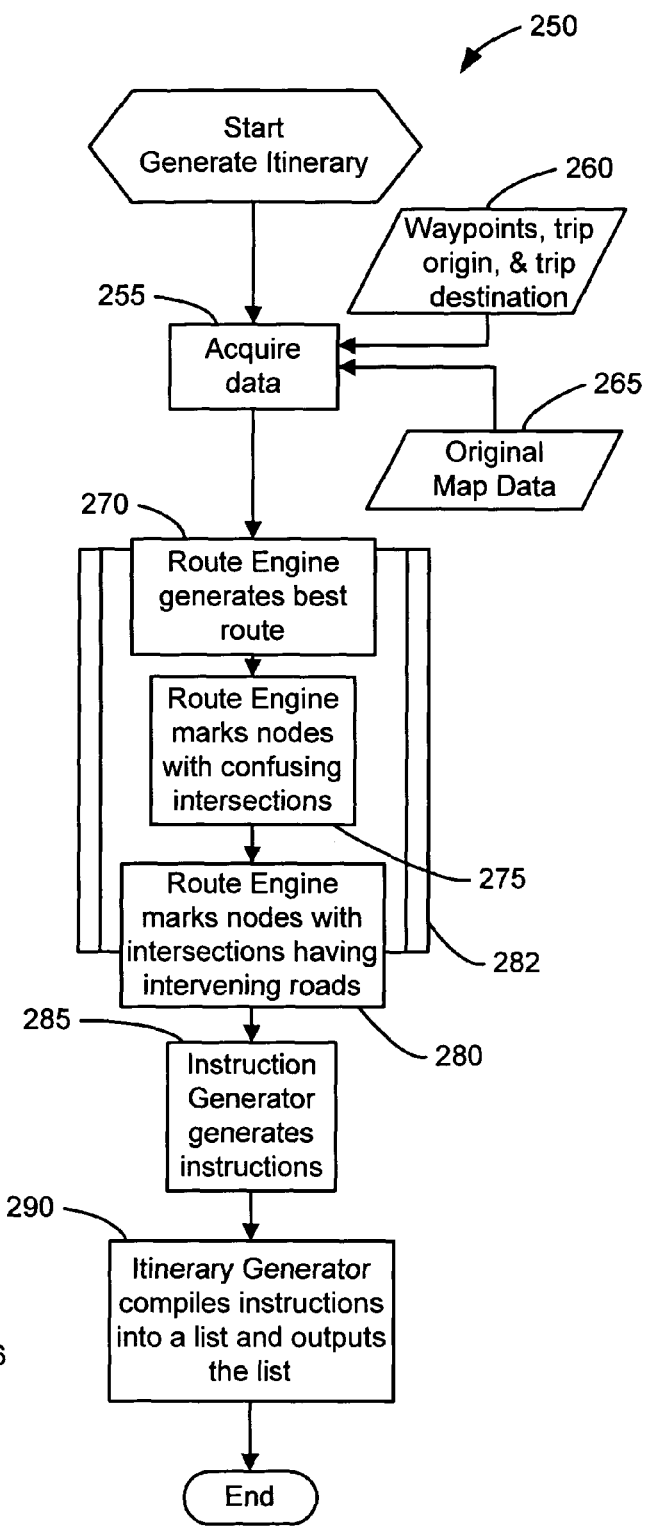
FIG. 2B is a flow chart illustrating an overview of an exemplary process for generating a route as depicted in FIG. 2A and for generating a list of textual driving directions according to one exemplary embodiment of the present invention.

FIG. 2B depicts an overview of an exemplary process, titled Generate Itinerary, for generating a route 200 and for generating a list of textual driving instructions. Given a trip origin 204 and a trip destination 205, Process 250 generates a route 200 as depicted in FIG. 2A. The Process 250 generates instructions, each of which is useful to guide a driver through a component of the route 200, and outputs an itinerary listing of instructions.

In one embodiment of the present invention, the processing steps in Process 250 are software routines. A computer system 100, as illustrated in FIG. 1, includes a Driving Directions Processing Module 175 that holds the coded routines. In this embodiment, the Driving Directions Processing Module 175 implements Process 250.

In Step 255, Generate Itinerary process 250 begins by acquiring data such as trip origin 204, 260 trip destination 205, 260 and waypoints 260 and original map data 265. Commercial sources of map data include Geographic Data Technology Inc. of Lebanon, N. H. and Navigation Technologies Corporation of Chicago, Ill. Waypoint data 260 specifies one or more preferred stop point along the route 200 and can include a point of overnight stay. Thus, waypoints are a category of nodes. In Step 270 of Module 282, a route engine 291 generates the route 200. In one embodiment, the route engine 291 optimizes the route 200 on a value such as shortest distance, least travel time, or best economy. When optimizing on best economy, cost calculations typically include fuel consumption, fuel price, and toll expenses. In Step 275, also of Module 282, the route engine 291 marks nodes with confusing intersections. In Step 280, the last step illustrated in Module 282, the route engine 291 marks nodes with intersections having intervening roads.

Following Step 280, the route engine 291 passes its results to the instruction generator module 292. In Step 285, the instruction generator module 292 generates instructions. An instruction is a piece of text, a phrase, a sentence, or a string of spoken or written words that guides a driver to navigate a portion of the route 200. For example, "Turn right on Main Street" is an instruction. In one exemplary embodiment of the present invention, Step 285 includes generating instructions to guide a driver from the origin 200 to the destination 205.

Step 290 follows generating the instructions in Step 285. In Step 290, the itinerary generator 296 compiles the set of instructions 295 into a list, or itinerary 297, and outputs the list. In one embodiment of the present invention, the itinerary generator function occurs within the instruction generator module 292. For example, the refined set of instructions 295 can be output to the user as a simple itinerary 297. Following Step 290, Process 250 ends.

FIG. 2B is a block diagram that illustrates the Driving Directions Processing Module 175, which is depicted in FIG. 1, and its relationships to software components that are depicted in FIG. 2B. The Driving Directions Processing Module takes input from a user and coordinates the Generate Itinerary process 250 depicted in FIG. 2B. User input typically includes a trip origin 204, trip destination 205, waypoints 260, and a request to generate an itinerary 297. In response the user input, the Driving Directions Processing Module 175 engages the route engine 291. The route engine 291 processes the map data 291 and generates a route 200. The Driving Directions Processing Module 175 then engages the instruction generator module 292. The instruction generator module executes Generate Instructions Routine 293. Routine 293 processes the route 200 using algorithms that include rules-based logic. The algorithms can access the raw map data 265 to investigate aspects of the route 200 related to a driver's natural perspective.

In one embodiment of the present invention, Generate Instructions Routine 293 produces driving directions by processing a route 200 in two passes. The first pass, which is executed from the main body of Routine 293 generates in initial set of driving instructions. Routine 293 calls Second Pass Routine 294 to execute the second pass. Second Pass Routine 294 refines the initial set of driving instructions by combining and eliminating instructions according to its rules-based logic. In one embodiment of the present invention, the instruction generator module 292 delivers the refined set of instructions 295 to the user as a simple itinerary 297.

Figure 2C:
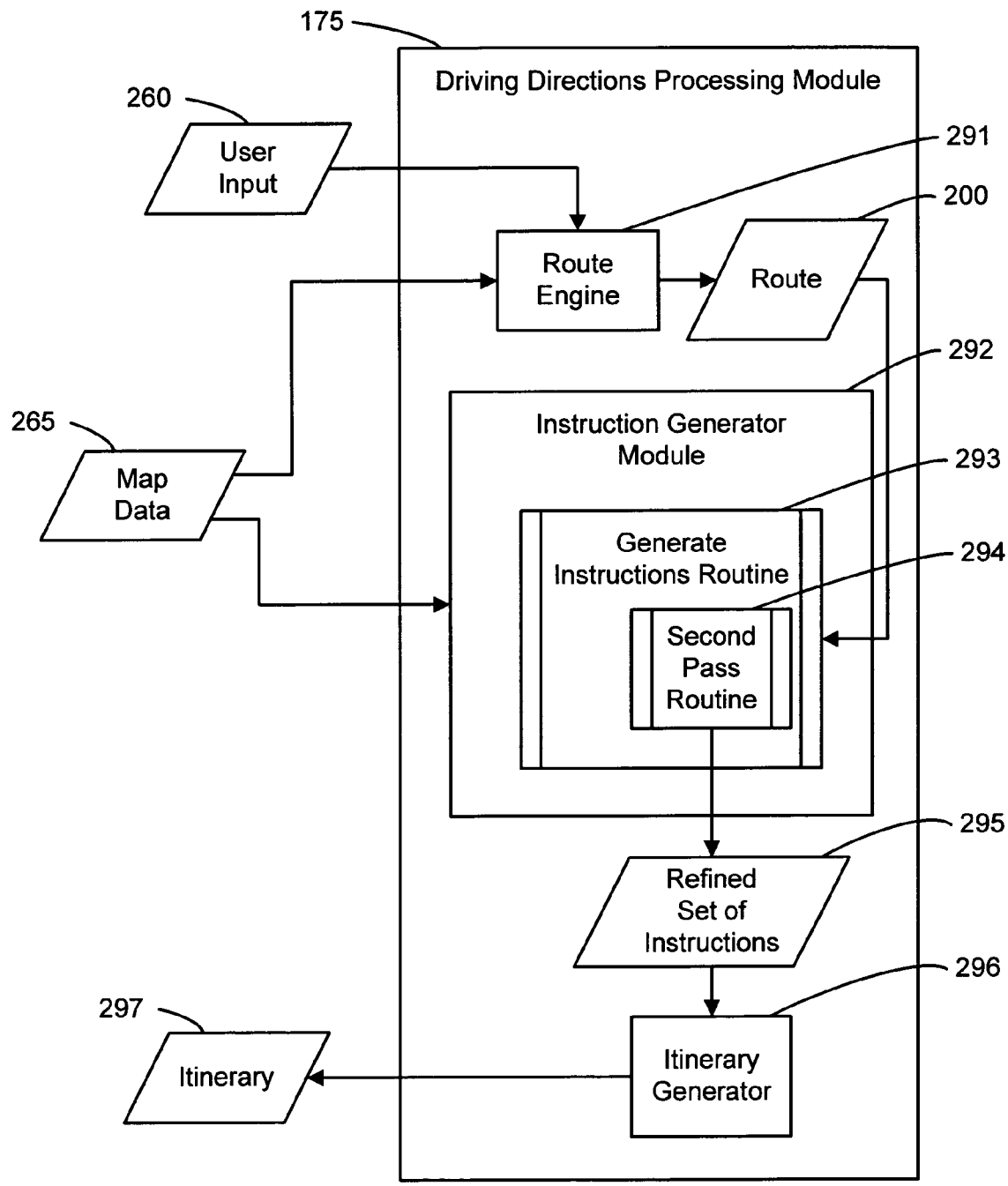
FIG. 2C is a functional block diagram illustrating relationships between software routines according to one exemplary embodiment of the present invention.

As illustrated in FIG. 2C, Second Pass Routine 294 outputs a refined or more concise set of driving instructions 295 which the Driving Directions Processing Module 175 sends to the itinerary generator 296. The Driving Directions Processing Module 175 engages to the itinerary generator 296 to compile the refined instruction set 295 into an itinerary 297. Finally, the Driving Directions Processing Module 175 outputs the itinerary 297 to the user.

Exemplary Conventions for Describing Intersection Geometry

Figure 3:
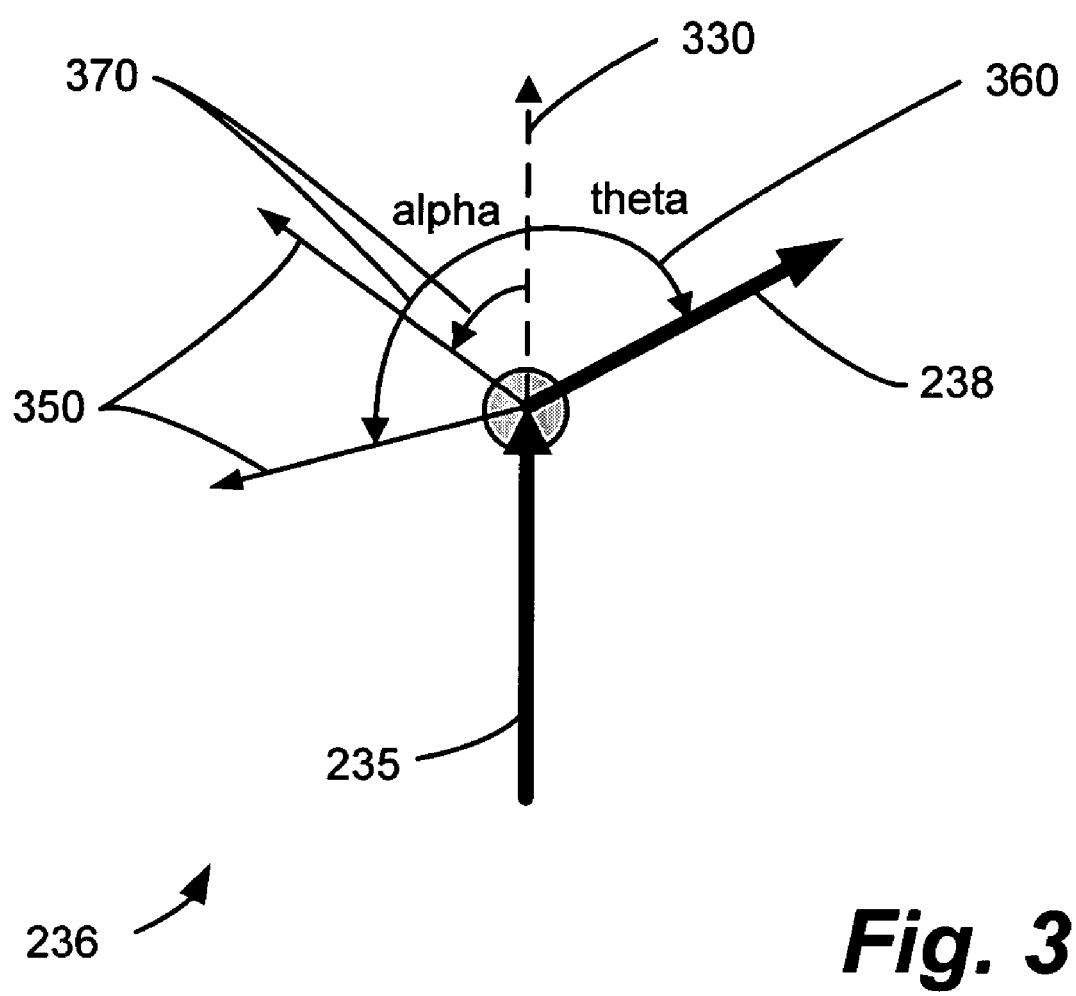
FIG. 3 depicts an arbitrary intersection of a route and illustrates exemplary conventions for describing the intersection according to one exemplary embodiment of the present invention.

FIG. 3 depicts an arbitrary intersection 236 along the route 200. FIG. 3 also introduces the geometric conventions of the processes and algorithms described below. The intersection 236 includes an entry road 235, an exit road 238, and an intervening road 350. Projection 330 is the path of entry road 235 projected through the intersection 236. In other words, projection 330 is the path a vehicle would travel if it entered the intersection 236 on entry road 235 and exited without changing course, regardless of available exit roads. This projection 236 also follows the approximate centerline of a driver's natural, forward-viewing driving perspective for most scenarios. Theta 360 is the angle between projection 330 and the exit road 238. Alpha 370 is the angle between projection 330 and intervening road 350. By convention, theta 360 and alpha 370 are positive if clockwise and negative if counterclockwise.

In one embodiment of the present invention, a computer program applies rules to the configuration of intersections 236 along a route 200. The program's rules can compose driving instructions by comparing the human driving perspective to the configuration of the intersection 236. The human driving perspective can be incorporated into the rules in by describing the perspective terms of the centerline that is discussed above and angular constraints, which are discussed below, composed around that centerline.

Overview of an Exemplary Process for Generating Instructions in Two Passes

Figure 4:
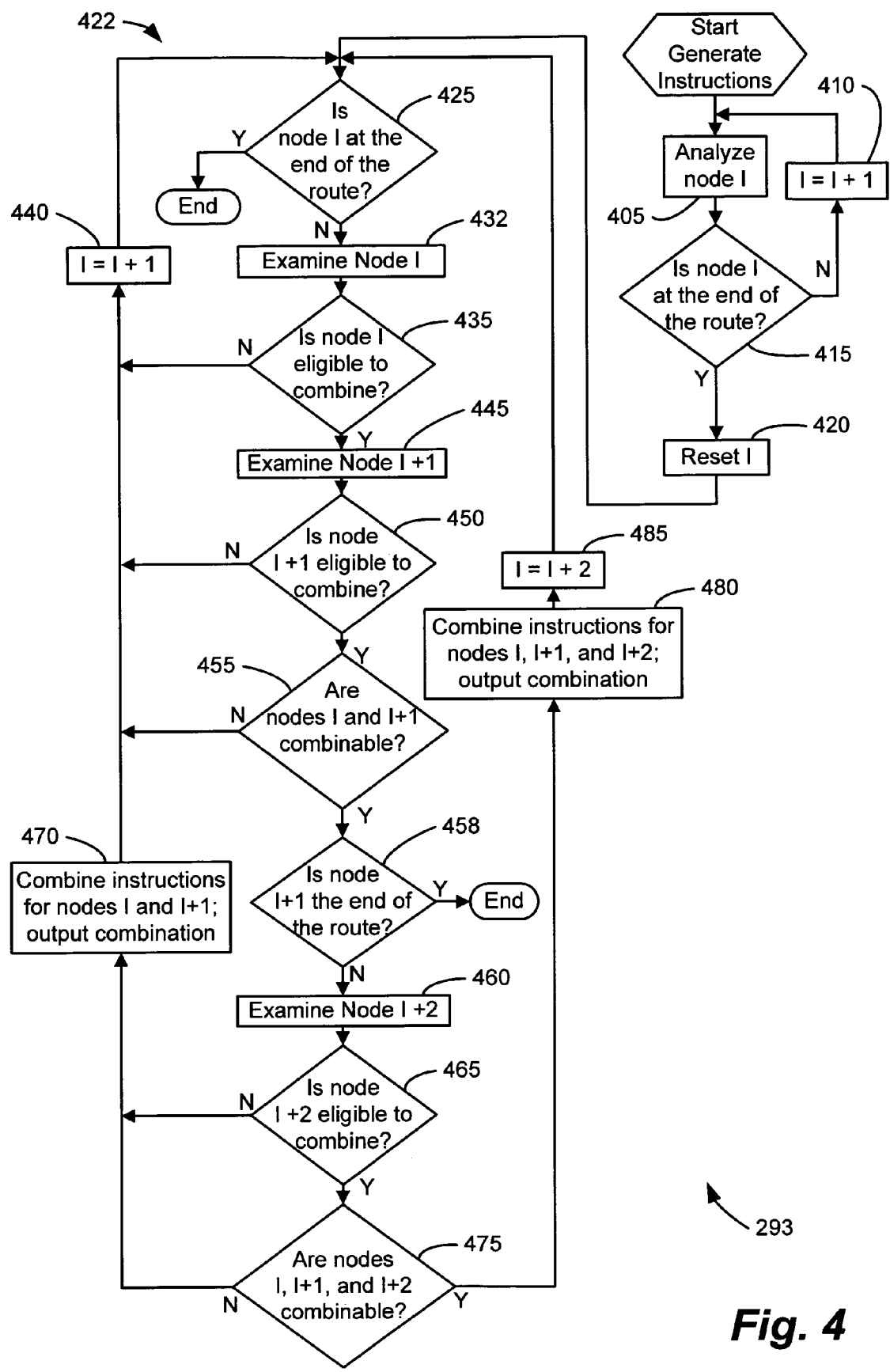
FIG. 4 is a flow chart illustrating an overview of an exemplary process for generating driving directions by processing a route in two passes according to one exemplary embodiment of the present invention.

FIG. 4 is an overview of an exemplary routine 293, referred to as Generate Instructions, for generating driving instructions by processing a route 200 in two passes. In the first pass, Routine 293 analyzes each node 236 separately. In the second pass, Routine 293 examines each node 236 relative to one or more adjacent nodes. If certain criteria are met, Routine 293 generates a combined instruction for two or more adjacent nodes. The combined instruction guides a driver to navigate multiple intersections 236 with a single instruction.

In one embodiment of the present invention, Process 250, which is illustrated in FIG. 2B, performs Routine 293. In this embodiment, Routine 293 can be a component of an instruction generator module 292. When a human enters a point of origin 204 and a point of destination 205 into a computer 100 and prompts the computer to generate a route and driving directions, the computer system 100 engages a driving directions module 175. The driving directions module 175 implements Process 250, which then executes Step 285. In Step 285 of Process 250, the instruction generator module 292 executes Routine 293, which is described below, to compose a set of driving instructions 295. When the set 295 is complete, Process 250 engages an itinerary generator to generate an itinerary 297 based on the set 295.

FIG. 5 and FIG. 6, which are described later in this paper, depict an exemplary routine that also generates driving instructions by processing a route 200 in two passes. FIG. 5 and FIG. 6 illustrate exemplary steps to conduct the analysis and inquiry steps depicted in FIG. 4. In comparison with FIG. 4, FIG. 5 and FIG. 6 provide more detail of exemplary processes to generate driving instructions according to one embodiment of the present invention. FIG. 4 also illustrates exemplary logic for combining three nodes into a single instruction, whereas FIGS. 5–6 offer a more detailed illustration of combining two nodes into a single instruction.

Referring now to FIG. 4, Process 293 includes a first loop, which incorporates Steps 405, 410, and 415, that performs a first processing pass on the route 200 and generates an initial set of instructions 295. A second-pass loop 422 is downstream in the flow chart 293. The second-pass loop 422 reprocesses the route 200 and refines the initial instruction set.

When the second-pass loop 422 encounters an intersection 236 with a first-pass instruction, it processes the next two adjacent intersections 236 in conjunction with the first intersection 236 and generates combined instructions as appropriate.

If the first intersection 236 and two adjacent intersections 236 all qualify to be combined, the second-pass loop 422 generates a combined instruction that covers all three intersections 236. If only the first intersection 236 and the immediately adjacent intersection 236 qualify to be combined, the second-pass loop 422 generates a combined instruction to cover those two intersections 236. If the first intersection 236 and the immediately adjacent intersection 236 do not qualify to be combined, the second-pass loop 422 retains the original instruction. When the second-pass loop 422 completes its second-pass processing of the first node, it steps to the next uncombined node and repeats the process for that node. The second-pass loop 422 steps through each intersection 236 along the route 200 and combines, if appropriate, each intersection 236 with one or two adjacent intersections 236. At the end of the route 205 Generate Instructions Routine 293 has compiled a full set 295 of single and multi-intersection instructions for the route 200. In one embodiment of the present invention, a process, such as Step 290 of Generate Itinerary 250 illustrated in FIG. 2B, assembles the instructions into an itinerary 297 and outputs the itinerary 297.

Step 405 is the first step in Routine 293. In Step 405, Routine 293 analyzes node I 236. With I initially set to zero, Step 293 generates an instruction for the route origin 204, node 0. In inquiry Step 415, Routine 293 determines if node I 236 is the end of the route 205. If node I 236 is not the end of the route 205, Routine 293 executes Step 410 and loops back to iterate Step 405. Step 410 increments I so that Step 405 analyzes each node 236 in the route 200 and generates an instruction for each node 236 in the route 200. Exemplary steps for analyzing each node 236 in the route 200 are illustrated in FIGS. 5A–5D and discussed below.

On the final iteration, inquiry Step 415 determines that node I 236 is the end of the route 205. Routine 293 then executes Step 420 and resets I to zero in preparation for a second pass 422 of analyzing the route nodes 236.

In the second pass 422, Routine 293 identifies adjacent nodes 236 that are preferentially described by a single, combined instruction and generates combined instructions as appropriate. In order to be combined, adjacent nodes 236 must meet two criteria. Each node 236 is tested to determine if it is eligible for combination. If a node 236 is not eligible, Routine 293 terminates further combination analysis on that node 236. If a node 236 is eligible to combine and one or two adjacent nodes 236 are also eligible to combine, Routine 293 determines which, if any, of the three nodes 236 are combinable. Routine 293 then generates combined instructions in accordance with the determination.

Inquiry Step 425 is the first step in the second pass loop 422. In Step 425, Routine 293 determines if node I 236 is the end of the route 205. If node I 236 is the end of the route 205, Routine 235 ends. If node I 236 is not the end of the route 205, Routine 293 executes Step 432 and examines node I 236. Next, in Step 435, Routine 293 determines if node I 236 is eligible to combine. If node I 236 is not eligible to combine, Routine 293 executes Step 440 and increments I. By incrementing I, Routine 293 steps to the next node 236 in the route 200 and iterates the end-of-route inquiry 425 and the eligibility inquiry 435.

If inquiry Step 435 determines that node I 236 is eligible to combine, Routine 293 executes Step 445 and examines node I+1 240. Next, in inquiry Step 450, Routine 293 determines if node I+1 240 is eligible to combine. If node I+1 240 is not eligible to combine, Routine 293 steps to the next node 236 in the route 200 and iterates the second-pass loop 422. If node I+1 240 is eligible to combine, Routine 293 executes inquiry Step 455.

In inquiry Step 455, Routine 293 determines if node I 236 and node I+1 240 are combinable. If the two nodes 236, 240 are not combinable, Routine 293 steps to the next node 236 in the route 200 and iterates the second-pass loop 422. If inquiry Step 455 determines that node I 236 and node I+1 240 are combinable, Routine 293 executes Step 458 to determine if node I+1 240 is the end of the route 205. If the node 240 is the end of the route 205, the routine 293 ends. If the node 240 is not the end of the route, Routine 293 executes Step 460 and examines node I+2 244.

Following Step 460, Routine 293 executes inquiry Step 465. Through inquiry Step 465, Routine 293 determines if node I+2 240 is eligible to combine. If node I+2 240 is not eligible to combine, Routine 293 executes Step 470. In Step 470, Routine 293 combines the instructions for node I 236 and node I+1 240 and outputs the combined instruction. Following Step 470, Routine 293 increments I, steps to the next node 236 in the route 200, and iterates the second-pass loop 422.

If inquiry Step 465 determines that node I+2 244 is eligible to combine, Routine 293 executes inquiry Step 475. In inquiry Step 475, Routine 293 determines if node I 236, node I+1 240, and node I+2 244 are combinable. If all three nodes are not combinable, then only node I 236 and node I+1 240 are combinable, and Routine 293 executes Step 470 to combine node I 236 and node I+1 240.

If inquiry Step 475 determines that node I 236, node I+1 240, and node I+2 244 are all combinable, then Routine 293 executes Step 480. In Step 480, Routine 293 combines the instructions of the three nodes 236, 240, 244 into a single, combined instruction and outputs that instruction. Following Step 480, Routine 293 executes step 485, sets I=I+2, and repeats the second pass loop 422.

Generate Instructions Routine 293 continues processing nodes 236 until it encounters the end of the route 205; at that point, it completes processing and terminations execution. In the first processing loop that is illustrated by Steps 405, 410, and 415, Generate Instructions Routine 293 composes an initial set of driving instructions. In the second processing loop 422, Generate Instructions Routine 293 refines the instruction set.

Exemplary Process for Generating Instructions

FIGS. 5A–5D and FIGS. 6A–6B are flow charts that illustrate an overview of an exemplary process for generating driving directions by processing a route 200 in two passes. The process 293 illustrated in FIGS. 5–6 is titled Generate Instructions Routine, as it is similar in many respects to the process 293 illustrated in FIG. 4. The FIGS. 5–6 process is an exemplary process that generally corresponds to the process methodology illustrated in FIG. 4.

The Generate Instructions Routine 293 executes the first route-processing pass from the main body of the program, which is illustrated in FIGS. 5A–5D. When Generate Instructions Routine 293 completes the first pass, it calls Second Pass 294, which is illustrated in FIGS. 6A–6D, to execute the second route-processing pass. The first pass process 293 generates a set of single-intersection instructions for the entire route 200. The second pass process 294 improves the set by suppressing undesirable instructions and combining single-intersection instructions into multi-intersection instructions for adjacent intersections 236 that meet certain criteria.

In the first pass, Routine or Process 293 steps through each intersection 236 along the route 200 beginning at the origin 204 and ending at the destination 205. As Process 293 processes each intersection 236 along the route 200, it applies programming logic to each intersection 236. The programming logic composes and outputs an instruction for each intersection 236 that needs an instruction. In one embodiment of the present invention, the programming logic includes rules that apply natural human driving perspective to components of the route 200. Certain aspects of the natural human driving perspective are described in terms of forward-viewing perspective and represented by geometric constructs.

In the second pass, Process 294 again steps through each intersection 236 along the route 200 beginning at the origin 204 and ending at the destination 205. Process 294 skips intersections 236 without first-pass instructions and processes intersections 236 with first-pass instructions. When Process 294 encounters an intersection 236 with a first-pass instruction, it processes the next adjacent intersection 236 in conjunction with the first intersection 236 and generates combined instructions as appropriate. If the two adjacent intersections 236 qualify to be combined, Process 294 generates a combined instruction that covers both intersections 236. If the first intersection 236 and the immediately adjacent intersection 236 do not qualify to be combined, Process 294 retains the original instruction generated by Process 293. When Process 294 has completed its second-pass processing of the first node 236, it steps to the next uncombined node 236 and repeats the process for that node 236. Process 294 steps through each intersection 236 along the route 200 and combines, if appropriate, each intersection 236 with an adjacent intersection 236. When Process 294 encounters the end of the route 205 it has compiled a full set 295 of single and multi-intersection instructions for the route 200. In one embodiment of the present invention, a process, such as Step 290 of Generate Itinerary 250 illustrated in FIG. 2B, assembles the instructions into an itinerary 297 and outputs the itinerary 297.

The individual steps and logic flow of Process 293 and Process 294 will now be described in detail following FIGS. 5A–D and FIGS. 6A–B. The conventions illustrated in FIG. 2A and FIG. 3 will be referenced throughout the discussion.

Figure 5A:
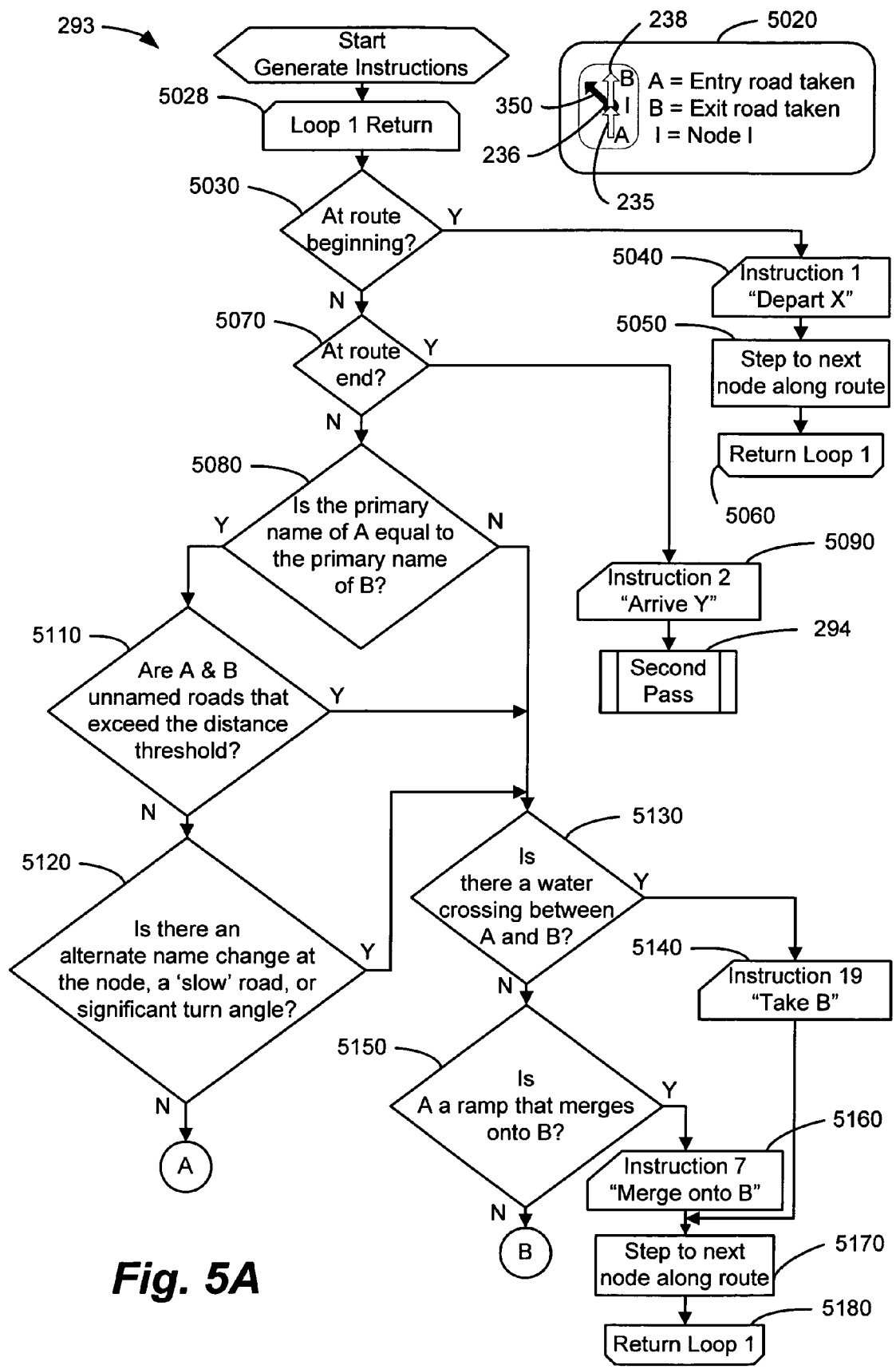
FIG. 5A is the first part of a flow chart illustrating an overview of the first pass of an exemplary process for generating driving directions by processing a route in two passes according to one exemplary embodiment of the present invention.

Exemplary Process for Generating Instructions, FIG. 5A Description

FIG. 5A is the first of four parts of the main flow chart for generating driving instructions by processing a route in two passes. To accompany the flow chart, FIG. 5A includes a diagram 5020 of a generic intersection 236 that is a component of the route 200 undergoing processing by Generate Instructions Routine 293. In conjunction with the diagram of FIG. 3, which illustrates angular aspects of a generic intersection, Diagram 5020 describes conventions that are referenced through out FIGS. 5A–5D. At various points in the flow pattern of the flow chart 293, diagrams that are similar to Diagram 5020 illustrate exemplary intersections that are in accord with the process flow.

The unfilled arrow 235 in Diagram 5020 that is labeled A depicts the portion of the route 200 leading into the intersection 236 that is labeled I. Road A 235 is the road that the driver follows into the intersection 236. The filled arrow 350 that is unlabeled depicts an intervening road 350 that is not part of the route 200 and that a driver should not follow out of the intersection 236. The unfilled arrow that is labeled B 238 depicts the portion of the route 200 leading out of the intersection 236. Road B 238 is the road that the driver should follow out of the intersection 236. This illustration 5020 provides a descriptive key to the steps and illustrations outlined in FIGS. 5A–D.

Generate Instructions Routine 293 includes a Loop 1 Return point 5028 that serves as a reference point in the processing flow. Many of the subsequent steps conditionally return to Loop 1 Return 5028 to iterate the processing on each node 236 in the route 200. In other words, when Generate Instructions Routine 293 completes the first-pass processing of each node 236, it steps to the next node 236 and initiates processing of that next node 236 by returning the process flow to Loop 1 Return 5028.

In the initial step 5030 of processing each node 236, Generate Instructions Routine 293 determines if the node is the origin 204 of the route 200. If the node is the origin 204 of the route 200, Generate Instructions Routine 293 composes Instruction 1 "Depart X" 5040 where X is the starting point of the route 200. The starting point 204 of the route 200 could be an address, an airport parking lot, or hotel, for example. Thus, the first instruction might be "Depart parking lot L of LAX airport."

Generate Instructions' logic and flow patterns enable waypoint processing to handle overnight stays and trips that are segmented into two or more legs. For routes 200 with waypoints, Generate Instructions Routine 293 can process each leg of the route 200 and generate an instruction set 295 for each leg. Generate Instructions Routine 293 can process a multi-leg route treating each waypoint, such as the location of an overnight stay at a hotel, motel, or campground as an origin 204 of a route 200.

After generating an instruction for the origin 204, Generate Instructions Routine 293 executes Step 5050 and steps to the next intersection 236 along the route 200. Generate Instructions Routine 293 executes Return Loop 1 5060 to initiate processing the next intersection 236.

Figure 6A:
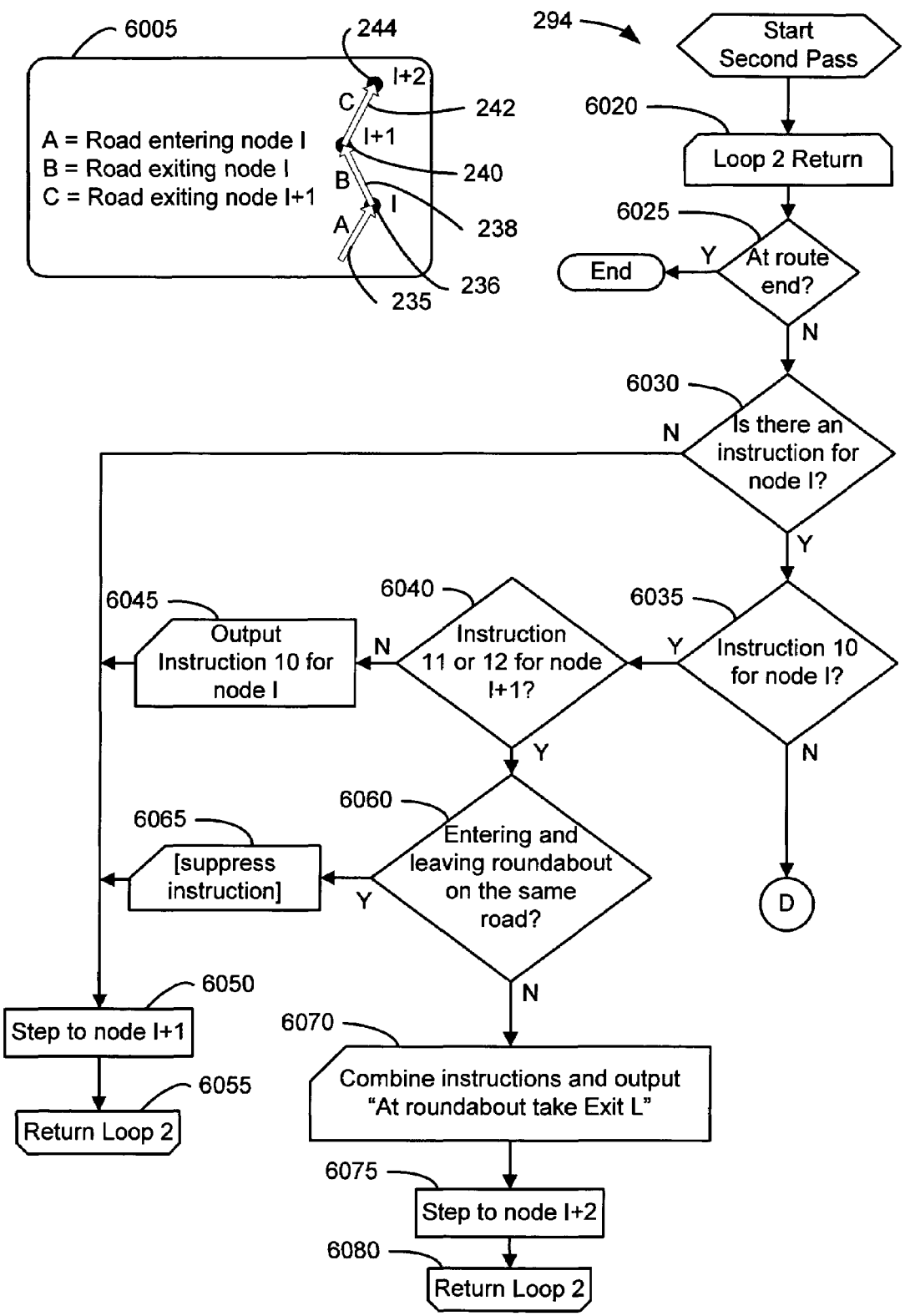
FIG. 6A is the first part of a flow chart illustrating an overview of the second pass of an exemplary process for generating driving directions by processing a route in two passes according to one exemplary embodiment of the present invention.
Figure 6B:
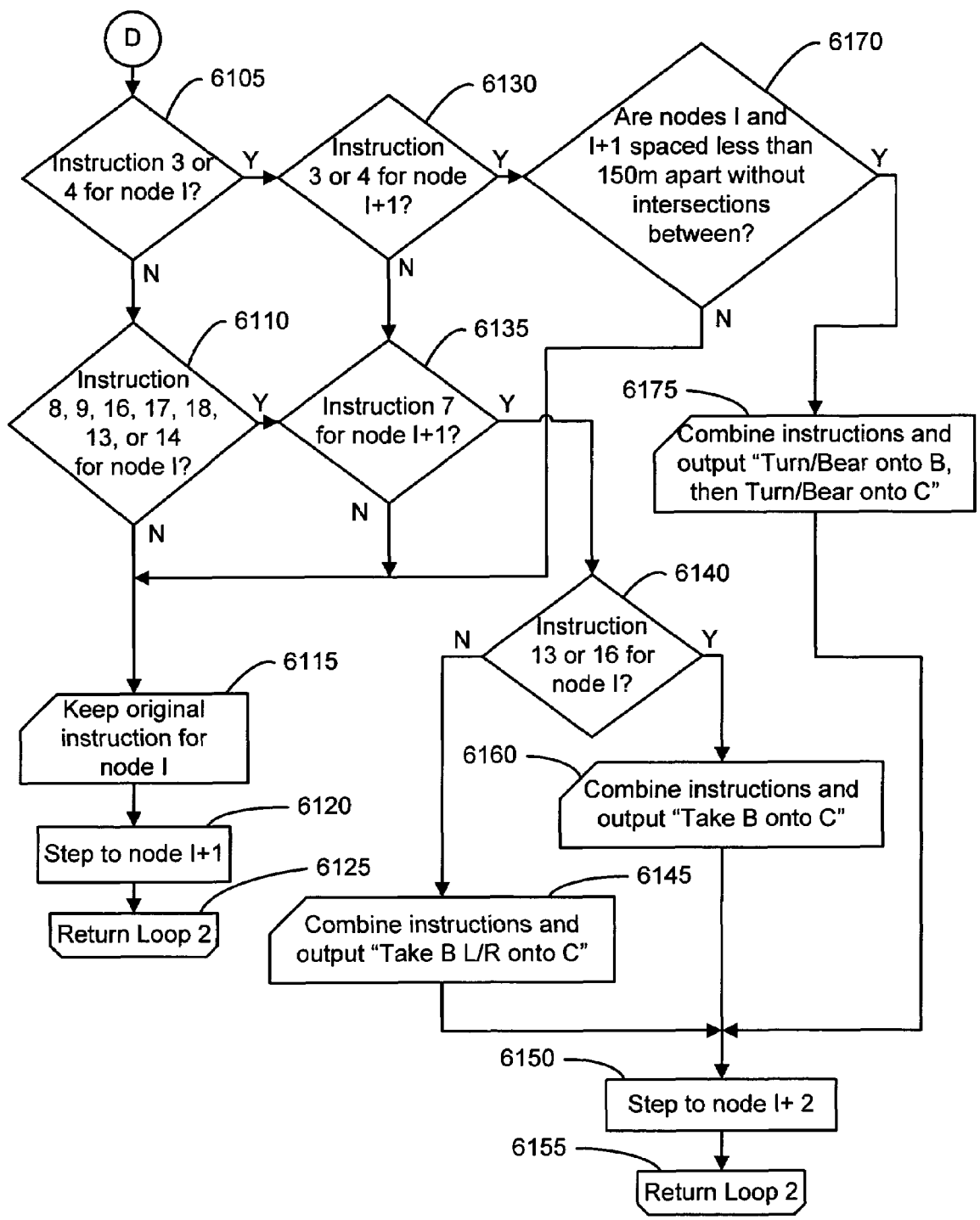
FIG. 6B is the second part of a flow chart illustrating an overview of the second pass of an exemplary process for generating driving directions by processing a route in two passes according to one exemplary embodiment of the present invention.

After determining that a node 236 is not the route origin 204, Generate Instructions Routine 293 determines if the node 236 is the end 205 of the route 200 by executing inquiry Step 5070. If the node is the end 205 of the route 200, Generate Instructions Routine 293 composes Instruction 2 "Arrive Y" 5090. "Arrive at LAX airport" is an example of Instruction 2 5090. Following the generation of the destination instruction 5090, Generate Instructions Routine 293 calls Second Pass 294 to execute the second pass processing of the route 200. Second Pass 294, which is illustrated by FIGS. 6A–6B and described in detail below, improves the instruction set by combining instructions for adjacent nodes 236 where such combination is appropriate.

If a node 236 is neither an origin node 204 nor a destination node 205 then it is a traditional intersection 236, and the process of characterizing the intersection 236 according to road names, intersection geometry, and human driving perspective begins.

Generate Instructions Routine 293 executes Step 5080 to determine if the intersection's entry road A 235 and exit road B 238 have the same primary name. Roads are sometimes known by two names, a primary name and a secondary name. For example, US Route 66 is known by a variety of secondary, local names as it passes through cities and towns across the United States. Small Town USA might refer to US 66 as Green Street on one side of an intersection and as Red Street on the other side. If the route 200 enters the intersection 236 on Green Street and exits the intersection 236 on Red Street, then Step 5080 determines that the primary name of the entry road 235 and the exit road 238 are the same.

If Step 5080 determines that the names of Road A and Road B are not the same, then Generate Instructions Routine 293 executes Step 5130, which is described below. If Step 5080 makes a positive determination, then Generate Instructions Routine 293 executes inquiry Step 5110 to determine if entry road A 235 and exit road B 238 are unnamed roads that exceed a distance threshold. If the distance between the intersection 236 and the preceding intersection 236, measured along Road A 235, is greater than a threshold and the distance between the intersection 236 and the next intersection 236, measured along Road B 238, is greater than a threshold, then Road A 235 and Road B 238 exceed the distance threshold. In one embodiment of the present invention, the threshold is set to 150 meters.

If Step 5110 determines that Road A 235 and Road B 238 are not unnamed roads that meet the distance threshold, then Generate Instructions Routine 293 executes Step 5120. Step 5120 determines if there is an alternate name change at the intersection 236, a slow road, or a significant turn angle. To make this determination, Step 5120 apples three criteria to the intersection 236.

An intersection 236 meets the first, alternate-name-change criterion if the secondary name of the entry road 235 is not identical to the secondary name of the exit road 238. In order for Generate Instructions Routine 293 to execute Step 5120, the primary name of the exit road 238 and the entry road 235 must string match. If, for example, the entry road 235 is US Route 66 and named Green Street, and the exit road 238 is US Route 66 and named Red Street, then there is an alternate name change at the intersection 236.

If the maximum speed of travel on the entry road 235 or the exit road 238 is less than or equal to a specified threshold, then the intersection 236 meets the second, slow-road criterion. In one embodiment of the present invention, the slow-road threshold for Step 5120 is 30 miles per hour. The intersection 236 meets the significant-turn-angle criterion if theta 360, as illustrated in FIG. 3, has a magnitude greater than a threshold. In one embodiment of the present invention, the third, significant-turn-angle threshold is 25 degrees.

If the intersection 236 does not meet at least one of the three criteria, then Step 5120 determines that there is not an alternate name change at the intersection 236, a slow road, or significant turn angle and Generate Instructions Routine 293 proceeds along a processing path illustrated in FIG. 5B and described below.

If the intersection 236 meets any of the three criteria set forth by inquiry Step 5120, then Generate Instructions Routine 293 executes inquiry Step 5130. Generate Instructions Routine 293 also executes Step 5130 if, as determined by inquiry Step 5110, Road A 235 and Road B 238 are unnamed roads that exceed a distance threshold, that is specific to Step 5110. The most common flow path to Step 5080 is through a negative determination by Step 5080, which, as described above, occurs when the primary name of Road A does not equal to the primary name of Road B.

Inquiry Step 5130 determines if there is a water crossing, such as a ferry, between Road A 235 and Road B 238. If a driver boards a ferry from Road A 235 and disembarks from the ferry onto Road B 238, then the instruction for that intersection 236 should not indicate a heading-type instruction. An instruction that directed the driver to "turn right off of the ferry," for example, would be an extraneous, undesirable instruction that does not conform to a driver's natural driving perspective. If there is a water crossing between Road A 235 and Road B 238, then Generate Instructions Routine 293 composes Instruction 19, "Take B," 5140 where B is the name of the ferry or road that the driver takes out of the ferry or other water crossing. "Take Edmunds Island Ferry" and "Take Green Street" are examples instruction for Step 5140. This instruction 5140 is concise and conforms to the driver's natural driving perspective. After outputting Instruction 19 5140, Generate Instructions Routine 293 executes Step 5170 and Step 5180 to step to the next intersection 236 and begin processing that intersection 236.

If Inquiry Step 5130 determines that there is not a water crossing between Road A 235 and Road B 238, then Generate Instructions Routine 293 executes Step 5150. Step 5150 determines if the intersection 236 is the point where a ramp merges onto Road B 238. If the intersection 236 is a simple point of merger between a ramp and a road, then the driver's natural perspective is ordinarily sufficient to guide the driver through the intersection 236. Consequently, Generate Instructions Routine 293 composes Instruction 7 "Merge onto B" 5160, where B is the name of the exit road 238. This is a simple, concise instruction that conforms to the driver's natural driving perspective. After composing Instruction 7, Generate Instructions Routine 293 steps to the next intersection 236 along the route 200 and initiates processing that intersection 236. If Step 5150 determines that Road A 235 is not a ramp that merges onto Road B 238, then route processing proceeds along a flow path illustrated in FIG. 5C and described below.

Figure 5B:
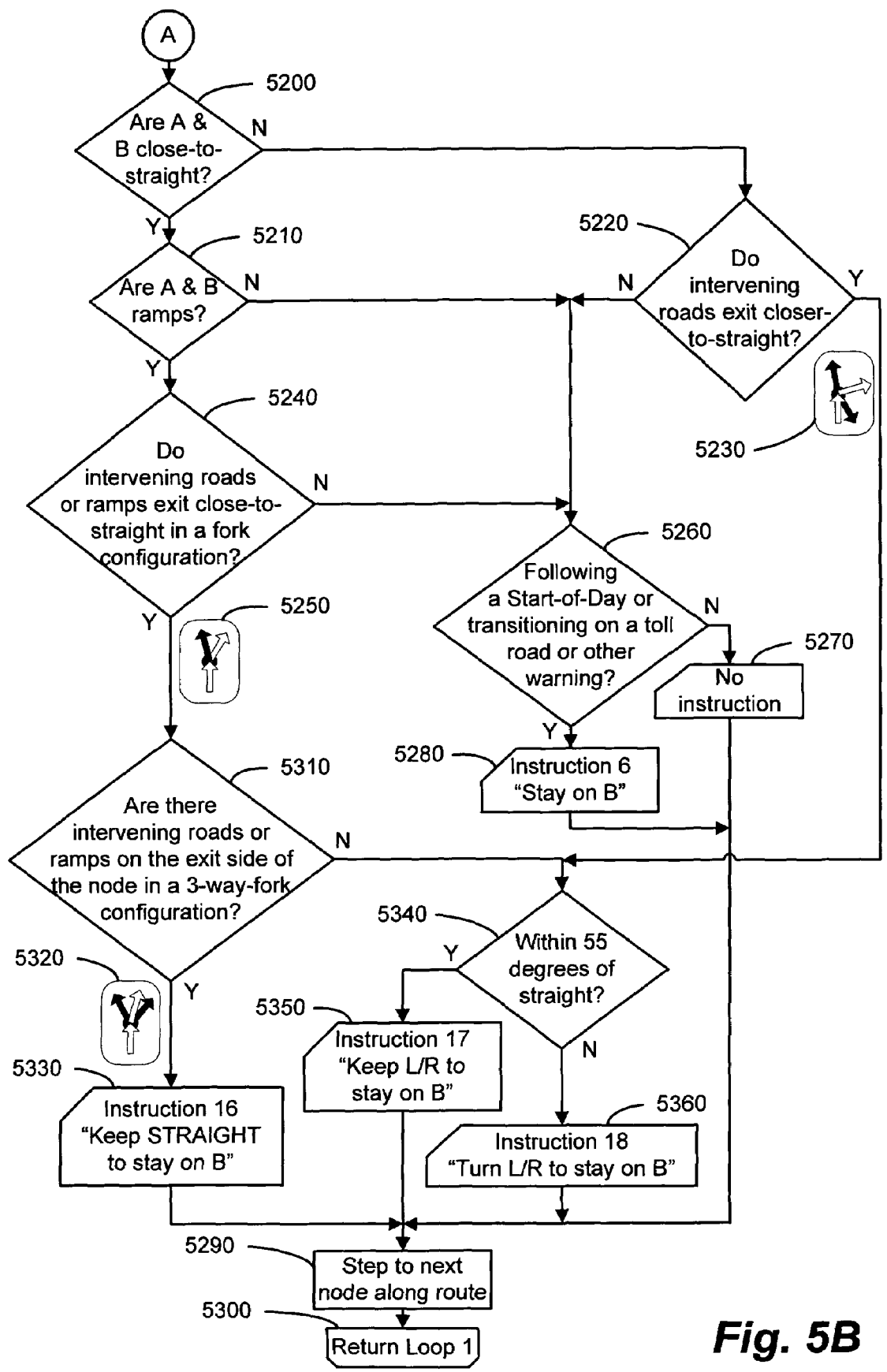
FIG. 5B is the second part of a flow chart illustrating an overview of the first pass of an exemplary process for generating driving directions by processing a route in two passes according to one exemplary embodiment of the present invention.

Exemplary Process for Generating Instructions, FIG. 5B Description

FIG. 5B is a flow chart that illustrates the process flow that Generate Instructions Routine 293 follows when inquiry Step 5120, which is illustrated in FIG. 5A, executes and makes a negative determination. As discussed above, inquiry Step 5120 makes a negative determination when there is not an alternate road name change associated with the intersection 236, neither the entry road 235 nor the exit road 238 is a slow road, and there is not a significant turn angle at the intersection 236. Inquiry Step 5200, which is depicted on FIG. 5B, is the first step that Generate Instructions Routine 293 executes following Step 5120's negative determination.

Inquiry Step 5200 determines if Road A 235 and Road B 238 are close-to-straight with respect to each other. To make this determination, Generate Instructions Routine 293 examines the geometry of the intersection 236 and assesses theta 360 to see if its magnitude is less than or equal to a threshold. In one embodiment of the present invention, the threshold is 33 degrees. For this embodiment, if theta 360 is between −33 degrees and +33 degrees, the determination is positive.

If Step 5200 determines that Road A 235 and Road B 238 are close-to-straight, Generate Instructions Routine 293 executes inquiry Step 5210. Inquiry Step 5210 determines if Road A 235 and Road B 238 are both ramps. If inquiry Step 5210 determines that Road A 235 and Road B 238 are not both ramps, Generate Instructions Routine 293 executes Step 5260. One reason that Generate Instructions Routine 293 inspects for ramps is that human drivers naturally perceive intersections 236 with ramps differently than intersections 236 without ramps. If Road A 235 and Road B 238 are ordinary roads, then an instruction is usually not needed and would be more detrimental than helpful.

If Step 5200 determines that Road A 235 and Road B 238 are close-to-straight, then Generate Instructions Routine 293 executes inquiry Step 5220. Inquiry Step 5220 determines if the intersection 236 has an intervening road 350 that exits closer to straight than the exit road 238. To make this determination, Generate Instructions Routine 293 examines the geometry of the intersection 236 and compares the magnitude of angle theta 360 to the magnitude of angle alpha 370. If the magnitude of alpha 370 is less than theta 360, then the intervening road 350 is going closer to straight than the exit road 238. Diagram 5230 illustrates an intersection 236 in which the intervening road 350 is going straighter than the exit road 238. If Step 5220 makes a negative determination, then Generate Instructions Routine 293 executes inquiry Step 5260, which will be described below. If Step 5220 makes a positive determination, then Generate Instructions Routine 293 executes inquiry Step 5340, which will be described below.

Step 5220 analyzes the intersection 236 from the driver's natural driving perspective. The driver's natural perspective is generally to follow the road that is going straightest with respect to the centerline of the natural, forward-viewing perspective. This centerline also typically represents a driver's line-of-sight and is a projection of the entry road 235 through the intersection 236. Drivers tend to ignore roads that fall outside of a driver's primary field of view, which can be represented by a primary viewing angle centered on the line-of-sight. If the configuration of the intersection 236 indicates that the driver would naturally follow the correct exit road 238 out of the intersection 236, then the present invention can withhold an instruction for that intersection 236.

In one embodiment of the present invention, Generate Instructions Routine 293 applies additional tests in conjunction to the criterion illustrated in the flow chart for Step 5220. For example, additional tests encompass rules that are based on road speed. A driver usually only considers taking a road if that road has similar speed to the road of current travel. Testing intervening roads for speed can eliminate extraneous instructions such as "Keep left to stay on SR-5" when SR-5 is a fast road and the intervening road 350 is a gravel road.

If Step 5210, which is described above, determines the entry road 235 and the exit road 238 are both ramps, then Generate Instructions Routine 293 executes inquiry Step 5240. Inquiry Step 5240 determines if an intervening road 350 or intervening ramp 350 exits the intersection 236 closer to straight that the exit road 238 that the driver should follow out of the intersection 236. Diagram 5250 illustrates the configuration of an intersection 236 that meets this criterion. To make this determination for Step 5240, Generate Instructions Routine 293 examines the configuration of the intersection 236. If the magnitude of alpha 370 is less than the magnitude of theta 360 and the magnitudes of both alpha 370 and theta 360 are less than a threshold, then Step 5240 determines that the criterion is met. In one embodiment of the present invention, the fork threshold for Step 5240 is 35 degrees.

If Step 5240 makes a positive determination, Generate Instructions Routine 293 executes Step 5310, which will be discussed below. If Step 5240 makes a negative determination, then Generate Instructions Routine 293 executes Step 5260. As described above, Generate Instructions Routine 293 also executes Step 5260 if inquiry Step 5220 executed and made a negative determination.

Step 5260 determines if the node 236 meets at least one of three criteria. If the node 236 is a start-of-day waypoint, then the node 236 meets the first criterion. This logic addresses the scenario in which a westward bound driver spends the night at a motel on US Route 66. When the driver resumes driving on the route 200 in the morning, the driver's natural driving perspective leads him/her to continue driving west. An instruction 5280 to "stay on US Route 66" is sufficient. The instruction preferentially does not include superfluous language such as "turn left out of the motel parking lot onto . . . " or "go west on . . . " If the node 236 is the transition between a free road and a toll road, then the node 236 meets the second criterion. For the third criterion, Generate Instructions Routine 293 determines if the node 236 is a warning-type node 236 that is a point of minor confusion. A transition from a paved road to a gravel road and a military check point are two examples of warning-type nodes 236. Generate Instructions Routine 293 composes a simple reassuring instruction for warning-type nodes 236 that Step 5260 processes. Thus, if Step 5620 determines that the node 236 meets at least one of these three criteria, Generate Instructions Routine 293 composes Instruction 6 "Stay on B" 5280, where B is the name of the road 238 taken out of the node 236.

If Step 5260 determines that the node 236 does not meet any of the three criteria, then Generate Instructions Routine 293 determines that the driver's natural driving perspective provides sufficient guidance through the intersection 236. In this case, Generate Instructions Routine 293 determines that an instruction for the node 236 would not be beneficial and, composes no instruction 5270 for the node 236.

After Step 5260 executes and generates either Instruction 6 5280 or no instruction 5270, the processing of that node 236 is complete. Generate Instructions Routine 293 then executes Step 5290, which steps to the next node 236 on the route 200, and begins processing that node 236 via Return Loop 1 5300

Step 5310 executes if Step 5240, as discussed above, makes a positive determination that the intersection 236 configuration includes intervening roads 350 or ramps that exit the intersection 236 close-to-straight in a fork configuration. Step 5310 determines if the intersection 236 has intervening road 350 or ramps on the exit side of the node 236 in a three-way-fork configuration. Diagram 5320 illustrates the configuration of an exemplary intersection 236 that meets Step 5310's criteria. To make the determination, Generate Instructions Routine 293 examines the configuration of the intersection 236. A positive determination requires the intersection 236 to include two intervening roads 350, each having an alpha angle 370 with a magnitude less than a threshold. For one embodiment of the present invention, the angular threshold is 50 degrees. A positive determination also requires that theta 360 is less than a second threshold. For one embodiment of the present invention, the second angular threshold is 15 degrees. If the intersection 236 meets these conditions then Generate Instructions Routine 293 composes Instruction 16 "Keep STRAIGHT to stay on B" 5330 where B is the name of the exit road 238 taken out of the intersection 236. Following the composition of Instruction 16 5330, Generate Instructions Routine 293 steps to the next node 236 and begins processing that node 236.

To illustrate one embodiment of the present invention, FIG. 5B recites Instruction 16 5330 with "STRAIGHT" in all capital letters to indicate that "straight," "right," or "left" can be inserted for "STRAIGHT" according to the geometric arrangement of the exit side of the intersection 236. The specific logic for this insertion is not detailed in the flow charts illustrated FIGS. 5 and 6 as it is readily implemented by those skilled in the computer-based mapping arts. If the magnitude of theta 360 is less than the magnitude of both alphas 370, then Instruction 16 5330 incorporates "straight." If theta 360 is greater than both alphas 370, then Instruction 16 5330 incorporates "right." If theta 360 is less than both alphas 370, then Instruction 16 5330 incorporates "left."

In the flow charts of FIGS. 5A–5D and FIGS. 6A–6B the exemplary instructions include similar phrases to indicate that left, straight, right, etc. can be inserted into the instruction according the specific geometric arrangement of the roads. For example "L/R" indicates that Generate Instructions Routine 293 preferably inserts "left" or "right" into the instruction according to the specific geometric arrangement of the roads. For the points in the flow charts in which logic is not illustrated, the logic will be readily apparent to those skilled in the computer-based mapping arts. Furthermore, the depiction of such logic in the figures could clutter the figures and obscure the primary flow patterns of the exemplary embodiment that is illustrated.

If inquiry Step 5310 makes a negative determination, then Generate Instructions Routine 293 executes Step 5340. Generate Instructions Routine 293 also executes Step 5340 when inquiry Step 5220 executes and makes a positive determination. Step 5340 determines if the intersection 236 has an intervening road 350 within 55 degrees of straight. More specifically, Step 5340 determines if the angle alpha 370 is less than or equal to 55 degrees.

If inquiry Step 5340 determines that the intersection 236 has an intervening road 350 within 55 degrees of straight, then Generate Instructions Routine 293 composes Instruction 17 "Keep L/R to stay on B" 5350, where B is the name of the exit road 238 and "L/R" is either "left" or "right," according to the specifics of the geometry. If inquiry Step 5340 determines that the intersection 236 does not have an intervening road 350 within 55 degrees of straight then Generate Instructions Routine 293 composes Instruction 18 "Turn L/R to stay on B" 5360. After generating either Instruction 17 5350 or Instruction 18 5360, Generate Instructions Routine 293 steps to the next node 236 on the route 200 and initiates processing on that node 236 by executing Return Loop 1 5300.

Figure 5C:
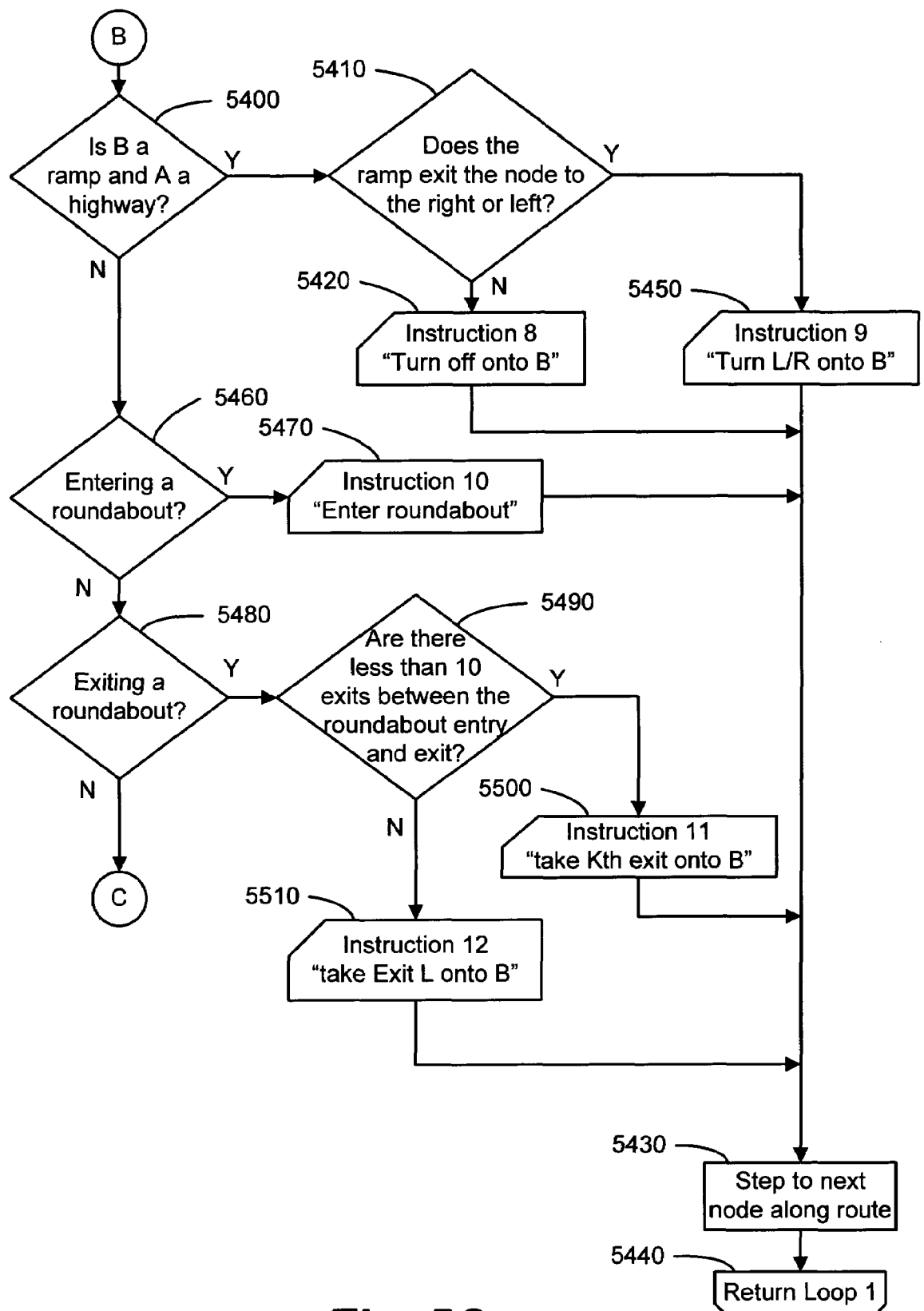
FIG. 5C is the third part of a flow chart illustrating an overview of the first pass of an exemplary process for generating driving directions by processing a route in two passes according to one exemplary embodiment of the present invention.

Exemplary Process for Generating Instructions, FIG. 5C Description

FIG. 5C is a flow chart that illustrates the process flow that Generate Instructions Routine 293 follows when inquiry Step 5150, which is illustrated in FIG. 5A, executes and makes a negative determination. As discussed above, inquiry Step 5150 makes a negative determination when the entry road 235 is not a ramp that merges on the exit road 238. Inquiry Step 5293, which is depicted on FIG. 5C, is the first step that Generate Instructions Routine 293 executes following Step 5150's negative determination.

Step 5293 determines if the exit road 238 is a ramp and the entry road 235 is a controlled access road such as an interstate highway. If the determination is negative, Generate Instructions Routine 293 proceeds, as will be discussed below, to determine if the intersection 236 is a roundabout 222. If the determination is positive, Generate Instructions Routine 293 executes inquiry Step 5410.

Inquiry Step 5410 determines if the exit road 238, which has already been determined to be a ramp, exits to the left or to the right. If the ramp 238 exits to the left or right of the original road, then Generate Instructions Routine 293 composes Instruction 9 "Turn L/R onto B" 5450, where B indicates the name or the number of the ramp and "L/R" indicates that the text "left" or "right" is inserted as appropriate. If the original road does not continue, for example when a highway ends in a ramp, or if the direction of the exit is not readily discernible from the given geometry, then Generate Instructions Routine 293 composes Instruction 8 "Turn off onto B" 5420. Following the composition of either Instruction 8 5420 or Instruction 9 5450, Generate Instructions Routine 293 executes Step 5430 to step to the next node 236 along the route 200 and then executes Return Loop 1 5440 to initiate processing that next node 236.

If inquiry Step 5293 determines that the intersection 236 does not include a controlled access highway as the entry road 235 and a ramp as the exit road 238, then Generate Instructions Routine 293 executes inquiry Step 5460 to determine if the intersection 236 is the entry point to a roundabout 222. If it is an entry point to a roundabout 222, then Generate Instructions Routine 293 composes Instruction 10 "Enter roundabout" 5470, steps to the next node 236 on the route 200, and initiates processing that node 236.

If inquiry Step 5460 determines that the node 236 is not an entry point for a roundabout 222, then Generate Instructions Routine 293 executes inquiry Step 5480 to determine if the node 236 is the exit point for a roundabout 222. If Step 5480 determines that the node 236 is the exit point of a roundabout 222, then Generate Instructions Routine 293 executes inquiry Step 5490 to assess the configuration of the roundabout 222.

Generate Instructions Routine 293 applies logic to the configuration of the roundabout 222 to compose instructions that are concise, clear, and easy to follow. Rather than issuing an instruction for each exit choice on the roundabout 222, Generate Instructions Routine 293 composes a single instruction, Instruction 10 5470, that guides a drive onto the roundabout 222 and a single instruction that guides a driver through and off of the roundabout 222. This approach to guiding a driver through a roundabout 222 conforms to the natural driving perspective.

Inquiry Step 5490 counts the number of exits that a driver passes between the entry point on the roundabout 222 and the exit point 224. If inquiry Step 5490 determines that there are fewer than 10 exits between the roundabout 222, entry point and the exit point 224, then Generate Instructions Routine 293 composes Instruction 11 "take Kth exit onto B" 5500, where B is the name of the road taken out of the roundabout 222 and K indicates the number of exits between the entry point and the exit point 224. In other words, Step 5500 substitutes "first," "second," "third," "fourth," "fifth," "sixth," "seventh," "eighth," "ninth," or "tenth" for "Kth." For example, Generate Instruction 293 might compose Instruction 11 5500 as "take the second exit onto Green Street."

If inquiry Step 5490 determines that there are ten or more exits between the roundabout 222 entry point and the exit point 224, then Generate Instructions Routine 293 composes Instruction 12 "take Exit L onto B" 5510, where B is the name of the road taken out of the roundabout 222 and L is the number of the exit taken off of the roundabout 222 in relation to the entry point. In other words, Step 5510 substitutes "11," "12," "13," "14," etc. for "L". For example, Generate Instruction 293 might compose Instruction 12 5510 as "take Exit 14 onto Green Street." After generating Instruction 11 or Instruction 12, Generate Instructions Routine 293 steps to the next node 236 along the route 200 and initiates processing that node 236.

Figure 5D:
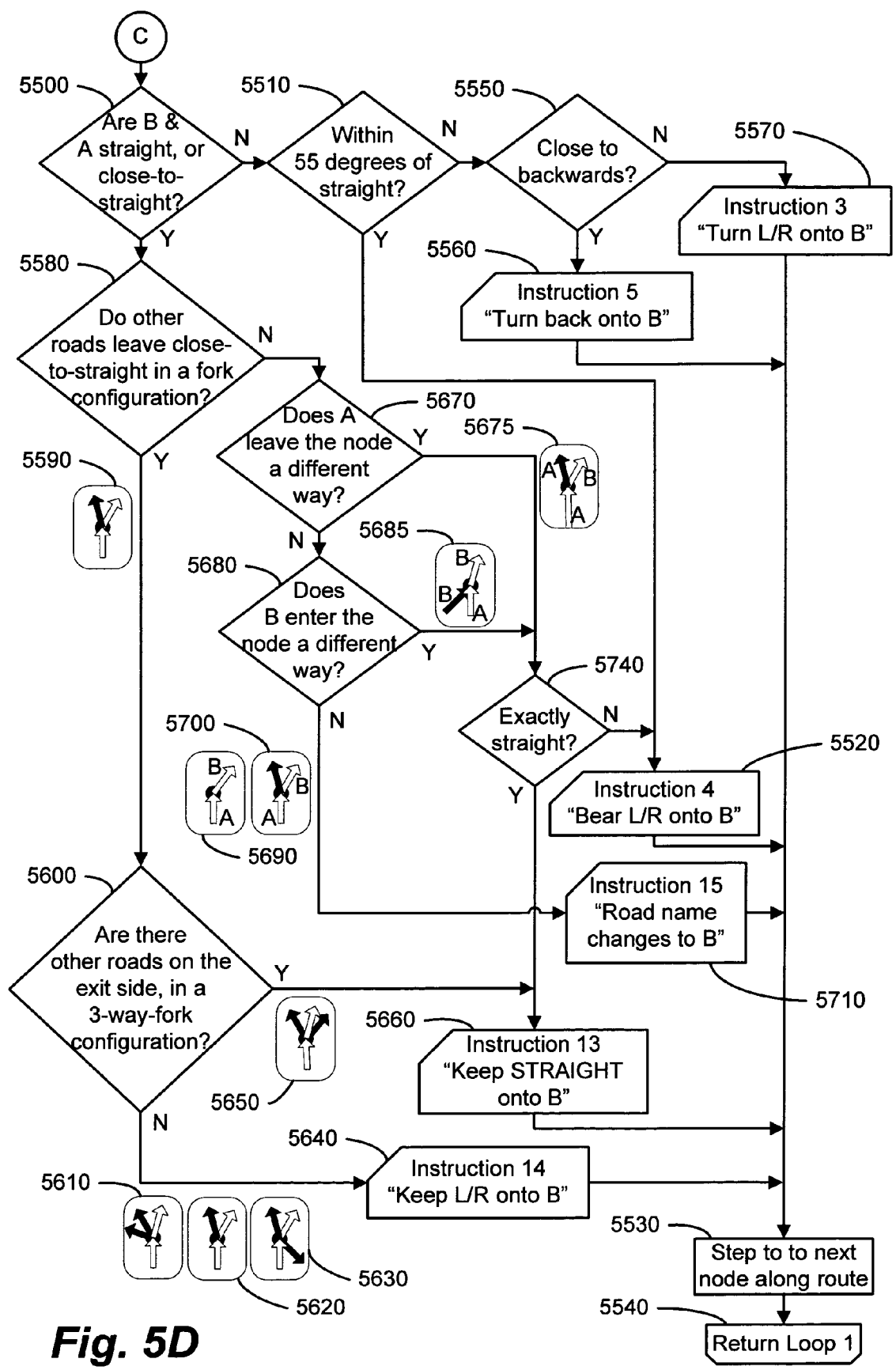
FIG. 5D is the fourth part of a flow chart illustrating an overview of the first pass of an exemplary process for generating driving directions by processing a route in two passes according to one exemplary embodiment of the present invention.

If the Step 5480 determines that the node 236 is not an exit point 224 of a roundabout 222, then Generates Instructions proceeds along a processing path illustrated in FIG. 5D and executes Step 5500, which is illustrated on that figure.

Exemplary Process for Generating Instructions, FIG. 5D Description

Inquiry Step 5500 determines if entry Road A 235 and exit Road B 238 are straight or close to straight with respect to each other. To make this determination, Generate Instructions Routine 293 examines the geometry of the intersection 236 and assesses theta 360 to see if its magnitude is less than or equal to a threshold. In one embodiment of the present invention, the threshold is 33 degrees. For this embodiment, if theta 360 is between −33 degrees and +33 degrees, the determination is positive. The flow pattern that Generate Instructions Routine 293 follows when Step 5500 makes a negative determination is described immediately below; the positive-determination flow path follows thereafter.

If inquiry Step 5500 determines that entry Road A 235 and exit Road B 238 do not meet the straightness threshold, then Generate Instructions Routine 293 applies a less stringent angular threshold criterion in Step 5510. In one embodiment of the present invention, as illustrated in FIG. 5B, Step 5510 determines if the entry road 235 and the exit road 238 are within 55 degrees of straight. Thus, Step 5510 makes a positive determination if the magnitude of theta 360 is greater than 15 degrees and less than or equal to 55 degrees. If Step 5510 makes this positive determination, then Generate Instructions Routine 293 composes Instruction 4, "Bear L/R onto B" 5520 where B is the name of the exit road 238 and "L/R" indicates that "left" or "right" is inserted into the instruction if theta 360 is negative or positive respectively. After generating Instruction 4 5520, Generate Instructions Routine 293 executes Step 5530 and Return Loop 1 5540 thereby initiating processing on the next node 236 in the route 200.

If inquiry Step 5510 determines that the entry road 235 and the exit road 238 are not within 55 degrees of straight, then Generate Instructions Routine 293 executes inquiry Step 5550 to determine if the exit road 238 is close to backwards. In one embodiment of the present invention, inquiry Step 5550 determines that the exit road 238 is close to backwards when the magnitude of theta 360 is greater than 115 degrees. If inquiry Step 5550 makes such a determination, then Generate Instructions Routine 293 composes Instruction 5 "Turn back onto B" 5560, where B is the name of the exit road 238 that the driver should follow. After generating Instruction 5 5560, Generate Instructions Routine 293 steps to the next node 236 and initiates processing that node 236.

If inquiry Step 5550 determines that the exit road 238 is not close to backwards, then Generate Instructions Routine 293 categorizes the intersection 236 as involving a turn. For Step 5550 to arrive at a negative determination, Step 5500 and Step 5510 must have also made a negative determination. Thus according to one embodiment of the present invention, a negative determination by Step 5550 means that the magnitude of theta 360 is greater than 55 degrees and less than 115 degrees. In this configuration, a typical driver would generally perceive the intersection 236 as a turn. Thus, if Step 5570 determines that the exit road 238 is not close to backwards, then Generate Instructions Routine 293 composes Instruction 3 "Turn L/R onto B" 5570, where B is the name of the exit road 238 and "left" or "right" is inserted for "L/R" if theta 360 is negative or positive respectively. After generating Instruction 3 5570, Generate Instructions Routine 293 steps to the next node 236 and initiates processing that node 236.

Referring now back to inquiry Step 5500, if Step 5500 makes a positive rather than a negative determination, then the entry road 235 and the exit road 238 are straight or close to straight. Generate Instructions Routine 293 then executes inquiry Step 5580 to determine if other roads leave close-to-straight in a fork configuration. In other words, Step 5580 determines if an intervening road 350 has an alpha angle 370 that is less than a threshold. For one embodiment of the present invention, this threshold is 30 degrees. Diagram 5590 illustrates the configuration of an exemplary intersection 236 that meets the positive-determination criterion. Whether Step 5580 makes a positive or negative determination, Generate Instructions Routine 293 proceeds to deduce a driver's natural driving perspective of the intersection 236 and to compose an instruction that conforms to that natural driving perspective.

Generate Instructions Routine 293 includes steps, such as inquiry Step 5580, Step 5600, Step 5670, and Step 5680, that compare the orientation of the correct exit path to the orientation of the incorrect exits path that a driver could take out of the intersection 236. Generate Instructions Routine 293 compares these paths options relative to one another, since such a comparison conforms to a driver's natural driving perspective. Responsive to the comparison, Generate Instructions Routine 293 composes an instruction that describes the intersection 236 from the driver's natural driving perspective. In other words, Generate Instructions Routine 293 composes an instruction that describe the path that should be taken with language that relates that correct path to the other incorrect path.

Most drivers have a natural tendency to stay on a set course. At an intersection 236, a driver has a natural tendency to select the exit road 238 that most closely matches the entry road 235 at the point that it enters the intersection 236. If, for example, a driving path follows an arc, a driver's natural tendency is to remain on the arc. The natural perspective of most drivers is to look ahead at path alternatives and choose the alternative that deviates least from the driver's If Step 5580 makes a positive determination, then Generate Instructions Routine 293 executes inquiry Step 5600 to determine if the intersection 236 has other roads on the exit side of the intersection 236 in a three-way-fork configuration. For this determination to be positive, the intersection 236 needs to have at least two intervening roads 350. Furthermore, the alpha angle 370 of each and every intervening road 350 needs to have a magnitude that is less than a threshold. For one embodiment of the present invention, that threshold is 45 degrees.

Diagram 5650 illustrates the configuration of an exemplary intersection 236 that meets Step 5600's positive-determination criterion. The illustrated intersection 236 has two intervening roads 350 and one correct exit road 238 that are the driver's path options. Since the alpha angle 370 of each road is between −45 degrees and +45 degrees, the intersection 236 meets Step 5600's positive determination criterion.

Following a positive determination by Step 5600, Generate Instructions Routine 293 composes Instruction 13 "Keep STRAIGHT onto B" 5660, where B indicates the insertion point for the name of the exit road 238. In one embodiment of the present invention, "STRAIGHT" indicates the insertion point for "straight," "left," or "right," depending on the angular relationship between the intervening roads 350 and the exit road 238. After generating Instruction 13 5660, Generate Instructions Routine 293 steps to the next node 236 along the route 200 and initiates processing that node 236.

Diagrams 5610, 5620, and 5630 illustrate the configurations of exemplary intersections 236 that fail to meet inquiry Step's positive-determination criterion and thus trigger a negative determination. In diagram 5610, the magnitude of the alpha angle 370 of one of the intervening roads 350 exceeds the exemplary 45 degree threshold. In diagram 5620, the intersection has only one intervening road 350. In diagram 5630, the magnitude of the alpha angle 370 of one of the intervening roads 350 exceeds the threshold.

Following a negative determination by Step 5600, Generate Instructions Routine 293 composes Instruction 14 "Keep L/R onto B" 5640. After generating Instruction 14 5640, Generate Instructions Routine 293 steps to the next node 236 along the route 200 and initiates processing that node 236.

Since the description of the flow path that Generate Instructions Routine 293 follows when Step 5580 makes a positive determination is complete, the negative-determination flow path will now be described. Generate Instructions Routine 293 executes inquiry Step 5670 following a negative determination by Step 5580. Step 5670 determines if the name of the intervening road 350 equals the name of the entry road 235 and the name of the exit road 238 is distinct from the name of the entry road 235. In other words, Step 5670 determines if the entry road 235 continues through the intersection 236 but the driver should exit the intersection 236 on a road that carries a different name.

Diagram 5675 illustrates the configuration of an exemplary intersection 236 that conforms to Step 5670's positive-determination criterion. Diagram 5685 illustrates the configuration of an exemplary intersection 236 that does not conform to Step 5670's positive determination criterion. The intersection 236 of Diagram 5685 fails to meet the positive determination criterion since there is no path option that carries the name of the entry road 235.

If Step 5670 makes a negative determination, then Generate Instructions Routine 293 executes Step 5680 to determine if B enters the node 236 a different way. In other words, Step 5680 determines if a road that is distinct from the entry road 235 passes through the intersection 236 without changing names. And furthermore, Step 5680 determines if the driver should select the leg of that road that has a theta angle with a magnitude less than a threshold. For one exemplary embodiment of the present invention, that threshold is 45 degrees.

Diagram 5685 illustrates the configuration of an exemplary intersection 236 that conforms to Step 5680's positive determination criterion. Diagram 5690 and Diagram 5700 illustrate the configurations of two exemplary intersections 236 that do not conform to Step 5680's positive determination criterion. The intersection 236 of Diagram 5690 fails to meet the positive determination criterion because the intersection 236 is only a name change. The intersection 236 of Diagram 5700 fails to meet the positive determination criterion because the exit road 238 starts at the intersection 236 and, therefore, has only one leg.

Following either a positive determination by Step 5680 or a positive determination by Step 5670, Generate Instructions Routine 293 executes Step 5740. Step 5740 determines if the entrance road 235 and the exit road 238 are straight with respect to one another. To make this determination, Generate Instructions Routine 293 examines the configuration of the intersection 236 to determine if the magnitude of theta is below a threshold. In one embodiment of the present invention, the threshold is 5 degrees.

If Step 5740 determines that the entry road 235 and exit road 238 meet the exactly-straight criterion, then Generate Instructions Routine 293 composes Instruction 13 "Keep STRAIGHT onto B" 5660, which is described above. If Step 5740 determines that the entry road 235 and the exit road 238 do not meet the exactly-straight criterions, then Generate Instructions Routine 293 composes Instruction 4 "Bear UR onto B" 5520, which is described above. After generating Instruction 4 5520 or Instruction 13 5660, Generate Instructions Routine 293 steps to the next node 236 and initiates processing that node 236.

If Step 5680, as discussed above, makes a negative determination, then Generate Instructions Routine 293 composes Instruction 15 "Road name changes to B," where B is the name of the exit road 238. After generating Instruction 15 5710, Generate Instructions Routine 293 steps to the next node 236 and initiates processing that node 236.

Generate Instructions Routine 293 steps through each node 236 and processes each node 236 one-by-one according to the flow patterns illustrated in FIGS. 5A–5D, until it reaches the end of the route 205. When Step 5070, which is depicted on FIG. 5A, determines that the first pass of route processing is complete, Generate Instructions Routine 293 calls Second Pass 294 to perform the second pass processing of the route 200. Second Pass 294, which is described by the flow chart illustrated in FIGS. 6A and 6B, improves the instruction set by combining, where appropriate, the instructions of adjacent nodes 236.

A summary of the numbered instructions that are illustrated in the flow chart 293 for Generate Instructions Routine 293 follows immediately below. These instructions exemplify instructions that the present invention can compose in a first processing pass and output for nodes 236 along a driving route 200.

No instruction 5270
Instruction 1 "Depart X" 5040
Instruction 2 "Arrive Y" 5090
Instruction 3 "Turn UR onto B" 5570
Instruction 4, "Bear UR onto B" 5520
Instruction 5 "Turn back onto B" 5560
Instruction 6 "Stay on B" 5280
Instruction 7 "Merge onto B" 5160
Instruction 8 "Turn off onto B" 5420
Instruction 9 "Turn UR onto B" 5450
Instruction 10 "Enter roundabout" 5470
Instruction 11 "take Kth exit onto B" 5500
Instruction 12 "take Exit L onto B" 5510
Instruction 13 "Keep STRAIGHT onto B" 5660
Instruction 14 "Keep L/R onto B" 5640
Instruction 15 "Road name changes to B"
Instruction 16 "Keep STRAIGHT to stay on B" 5330
Instruction 17 "Keep L/R to stay on B" 5350
Instruction 18 "Turn L/R to stay on B" 5360
Instruction 19 "Take B" 5140

Exemplary Process for Generating Instructions, FIG. 6A Description

FIG. 6A and FIG. 6B depict a flow chart that illustrates the flow pattern and logic of the process 294 titled Second Pass. After Generate Instructions Routine 293 completes the first-pass processing of the route 200 and composes an initial set of instructions, Generate Instructions Routine 293 calls Second Pass 294 to process the route 200 with a second pass and refine the instruction set.

Second Pass 294 steps through and processes each node 236 in the route 200. The processing of each node 236 includes analyzing any instruction that Generate Instructions Routine 293 composed in the first processing pass. Each instruction inherently carries information regarding the node 236 to which it applies. Therefore, Second Pass 294 can deduce information about the node and the route from the instruction itself.

FIG. 6A includes a diagram 6055 that depicts a generic section of a route 200 with three adjacent intersections 236 connected by three roads. Road A 235 is the road leading into node I 236. Road B 238 connects node I 236 to node I+1 240. Road C 242 connects node I+1 240 to node I+2 244. The illustrated flow chart 294 and the description below follow the conventions that Diagram 6055 sets forth.

The first section of Second Pass 294's process flow 294 includes Loop 2 Return 6020. Second Pass 294 iterates processing from this point forward for each node 236 in the route 200. In other words, when after Second Pass 294 finishes processing each node 236, it executes a return loop instruction which directs the execution of process steps back upstream to Loop 2 Return 6020.

Second Pass 294 executes inquiry Step 6025 for each node 236 to determine if that node 236 is the route destination 205. When Second Pass 294 steps to the route destination 205, the process of refining the set of instructions is complete and Second Pass 294 and Generate Instructions Routine 293 both end. In one embodiment of the present invention, another software routine, such as an itinerary generator 296, produces an itinerary 297 based on the refined instruction set 295.

If the node 236 under examination, which is node I 236, is not the destination 205, then Second Pass 294 executes Step 6030 to determine if Generate Instruction 293 composed an instruction for that node 236. If the first processing pass determined that the node 236 did not need an instruction, then Second Pass 294 executes Step 6050 to step to node I+1 240, which is the next node 236 along the route 200. After stepping to the next node 236, Second Pass 294 executes Return Loop 2 6055 to return the program flow back to Loop 2 Return 6020 and initiate second-pass processing that node 236.

If inquiry Step 6030 determines that the instruction set includes an instruction for the node I 236, which is the node undergoing processing, then Second Pass 294 executes inquiry Step 6035. Inquiry Step 6035 determines if Instruction 10 was generated in the first processing pass. Since Instruction 10 5470 describes the entrance to a roundabout 222, a positive determination by Step 6035 triggers Second Pass 294 to investigate the possibility of simplifying the node-I instruction for entering the roundabout 222 and the node-I+1 instruction for exiting the roundabout 222. Second Pass 294 proceeds with the roundabout 222 investigation in the remaining processing steps illustrated in FIG. 6A.

Inquiry Step 6040 is the first processing step in Second Pass's investigation to simplify roundabout instructions. Step 6040 determines if the instruction set includes Instruction 11 "take Kth exit onto B" 5500 or Instruction 12 "take Exit L onto B" 5510 for node I+1 240. If the determination is negative, then Second Pass 294 executes Step 6045 to retain Instruction 10 for node I 236. If the determination is positive, then Second Pass 294 proceeds to determine if the instructions for entering and exiting the roundabout 222 can be combined or eliminated.

Step 6060 determines if the route 200 enters and exits the roundabout 222 on the same road. If the name of the entry road 235 string matches the name of the exit road 238, then Second Pass 294 executes Step 6065 to suppress the instruction for entering onto the roundabout 222. Under these conditions, Second Pass 294 determines that the driver's natural driving perspective provides sufficient guidance to cover the entrance to the roundabout 222. After suppressing the instruction, Second Pass 294 steps to node I+1 240, which is the next node on the route 200, and initiates second pass processing of that node.

If Step 6060 determines that the names of the roundabout entry road 235 and the roundabout exit road 238 do not match, then Second Pass 294 executes Step 6070 to compose a single, combined instruction that describes the entrance and the exit. Step 6070 generates "At roundabout take Exit L" 6070 where "Exit L" is the name of the roundabout exit. After generating the combined instruction 6070, Second Pass 294 executes Step 6075 to step to node I+2 244. Step 6075 skips node I+1 240 since the combined instruction 6070 adequately describes that node 236. After executing Step 6075, Second Pass 294 executes Step 6080 to initiate processing on node I+2 244.

If Step 6035 determines that node I 236 is not the entrance to a roundabout 222, then Second Pass 294 does not engage the roundabout processing summarized in Steps 6040–6080. Following this determination, Second Pass 294 proceeds with route processing according to the steps illustrated in FIG. 6B.

Exemplary Process for Generating Instructions, FIG. 6B Description

FIG. 6B illustrates the second of two figures that depict a flow chart for Second Pass 294. Inquiry Step 6105 is the first step of the second-pass process that is depicted on FIG. 6B. Second Pass 294 executes inquiry Step 6105 following a negative determination by Step 6035, which is illustrated in FIG. 6A.

Inquiry Step 6105 determines if the first-pass instruction for node I 236 is Instruction 3 "Turn L/R onto B" 5570 or Instruction 4, "Bear L/R onto B" 5520. If the determination is negative, then Second Pass 294 executes inquiry Step 6110.

Step 6110 determines if the first-pass instruction for node I 236 is:

Instruction 8 "Turn off onto B" 5420;
Instruction 9 "Turn L/R onto B" 5450;
Instruction 13 "Keep STRAIGHT onto B" 5660;
Instruction 14 "Keep L/R onto B" 5640;
Instruction 16 "Keep STRAIGHT to stay on B" 5330;
Instruction 17 "Keep L/R to stay on B" 5350; or
Instruction 18 "Turn L/R to stay on B" 5360.

In Step 6030 and 6105, which are upstream in the process flow, Second Pass 294 ruled out Instruction 10 "Enter roundabout" 5470, Instruction 3 "Turn L/R onto B" 5570, and Instruction 4, "Bear L/R onto B" 5520. If Step 6110 makes a negative determination, then Second Pass 294 executes Step 6115 and keeps the original instruction. Since the upstream steps have already ruled out most of the potential instructions, Step 6115 keeps Instruction 5, 6, 7, 11, 12, 15, or 19. After determining to keep the instruction for node I 236, Second Pass 294 executes Step 6120 and Step 6125 to step to the next node 236 and initiate processing that node 236. If inquiry Step 6110 makes a positive determination rather than a negative one, then Second Pass 294 executes inquiry Step 6135, which will be discussed below.

If inquiry Step 6105 determines that the first pass instruction for node I 236 is Instruction 3 or 4, then inquiry Step 6130 determines if the instruction for node I+1 240 is Instruction 3 or 4. If the determination is negative, Second Pass 294 executes inquiry Step 6135, which will be discussed below.

If the determination is positive, then Step 6170 determines if intersection I 236 and intersection I+1 240 are spaced within 150 meters of one another without an intersection 236 between them. If the intersections meet the criteria, then Second Pass 294 executes Step 6175 to compose combined instruction 6175, "Turn/Bear onto B, then Turn/Bear onto C." Second Pass 294 inserts the name of the road that connects intersection I 236 with intersection I+1 240 for "B" and the name of the road that exits intersection I+1 240 for "C". Second Pass 294 selects "Turn" or "Bear" for each of the two insertion points in the instruction based on the previous, first-pass assignment of Instruction 3 or Instruction 4. "Bear right onto Green Street, then turn left onto Main Street" is an example instruction for Step 6175.

After generating the combined instruction, Second Pass 294, executes Step 6150 and Step 6155 to step to node I+2 244 and initiate processing that node. Second Pass 294 steps to node I+2 244 since the combined instruction applies to node I 236 and node I+1 240.

If inquiry Step 6130 makes a negative determination or inquiry Step 6110 makes a positive determination, then Second Pass 294 executes inquiry Step 6135. Inquiry Step 6135 determines if Generate Instructions Routine 293 composed Instruction 7 "Merge onto B" 5160 for node I+1 240 in the first pass. If Instruction 7 5160 is not assigned to node I+1 240, then Second Pass 294 keeps the original instruction for node I 236, steps to node I+1 240, and initiates processing that node.

If inquiry Step 6170 determines that node I 236 and node I+1 240 are spaced more than 150 meters apart or that there is an intersection 236 between them, then Second Pass 294 keeps the original instruction for node I 236, steps to node I+1 240, and initiates processing that node.

If inquiry Step 6135, which is described above and positioned upstream in the flow chart 294, determines that Generate Instructions Routine 293 composed Instruction 7 "Merge onto B" 5160 in the first processing pass, then Second Pass 294 generates a combined instruction for node I 236 and node I+1 240. To compose language that conforms to the driver's natural driving perspective, Second Pass 294 executes inquiry Step 6140.

Inquiry Step 6140 determines if the first processing pass composed Instruction 13 "Keep STRAIGHT onto B" 5660 or Instruction 16 "Keep STRAIGHT to stay on B" 5330 for node I 236. A negative determination by Step 6140 indicates a significant turn at intersection I+1 240 between Road B 238 that leads into that intersection 236 and Road C 242 that leads out of that intersection 236. A positive determination indicates that Road B 238 and Road C 242 are essentially straight with respect to one another. In either case, Second Pass 294 composes a combined instruction with concise language that guides a driver through intersection I 236, across Road B 238, through intersection I+1 240, and onto Road C 242.

If Inquiry Step 6140 makes a negative determination, Second Pass 294 composes "Take B L/R onto C" 6145, for example "Take First Street left onto Maple Avenue." If Inquiry Step 6140 makes a positive determination, Second Pass 294 composes "Take B onto C," for example "Take First Street onto Maple Avenue." Steps 6140 in conjunction with Step 6145 and Step 6160 can also compose combined instructions for components of a cloverleaf interchange. These steps can compose a single instruction that guides a driver from one interstate highway onto a ramp that is a component of the cloverleaf, through the cloverleaf, and onto the other interstate highway. After generating the appropriate combined instruction, Second Pass 294 steps to node I+2 244 and initiates second pass processing.

Second Pass 294 applies the processing logic described above to each node 236 on the route 200. For each node 236, Second Pass 294 determines if a combined instruction should be composed to describe that node 236 and the next adjacent node 236. If a combined instruction is not appropriate, Second Pass 294 steps to the next node 236 along the route 200. If a combined instruction is appropriate, Second Pass 294 composes the instruction and steps ahead one node 236 along the route 200. After either stepping to the next node 236 or stepping ahead one node 236, Second Pass 294 returns process flow to a point 6020 in the initial section of the flow chart 294, as illustrated on FIG. 6A. After returning the process flow, Second Pass 294 determines if the new node 236 is the route destination 205. Upon encountering the route destination 205, Second Pass 294 and Generate Instructions Routine 293 both end. The first processing pass and the second processing pass have composed a set of refined instructions 295 that emulate natural human language and conform to the natural driving perspective.

Exemplary Process for Generating Instructions by Processing a Route Stepwise

Generate Instructions Routine 293 and sub-process Second Pass compose a set of refined instructions 295 by first stepping though the full route 200 and generating an initial set of instructions and second re-stepping the full route 200 and refining the initial set of instructions. In an alternative embodiment of the present invention, which is illustrated in FIG. 7, a computer program composes and refines instructions in a single processing pass of the route 200. The computer program can process the route 200 in segments, generating and refining instructions for each section along the route 200.

Figure 7:
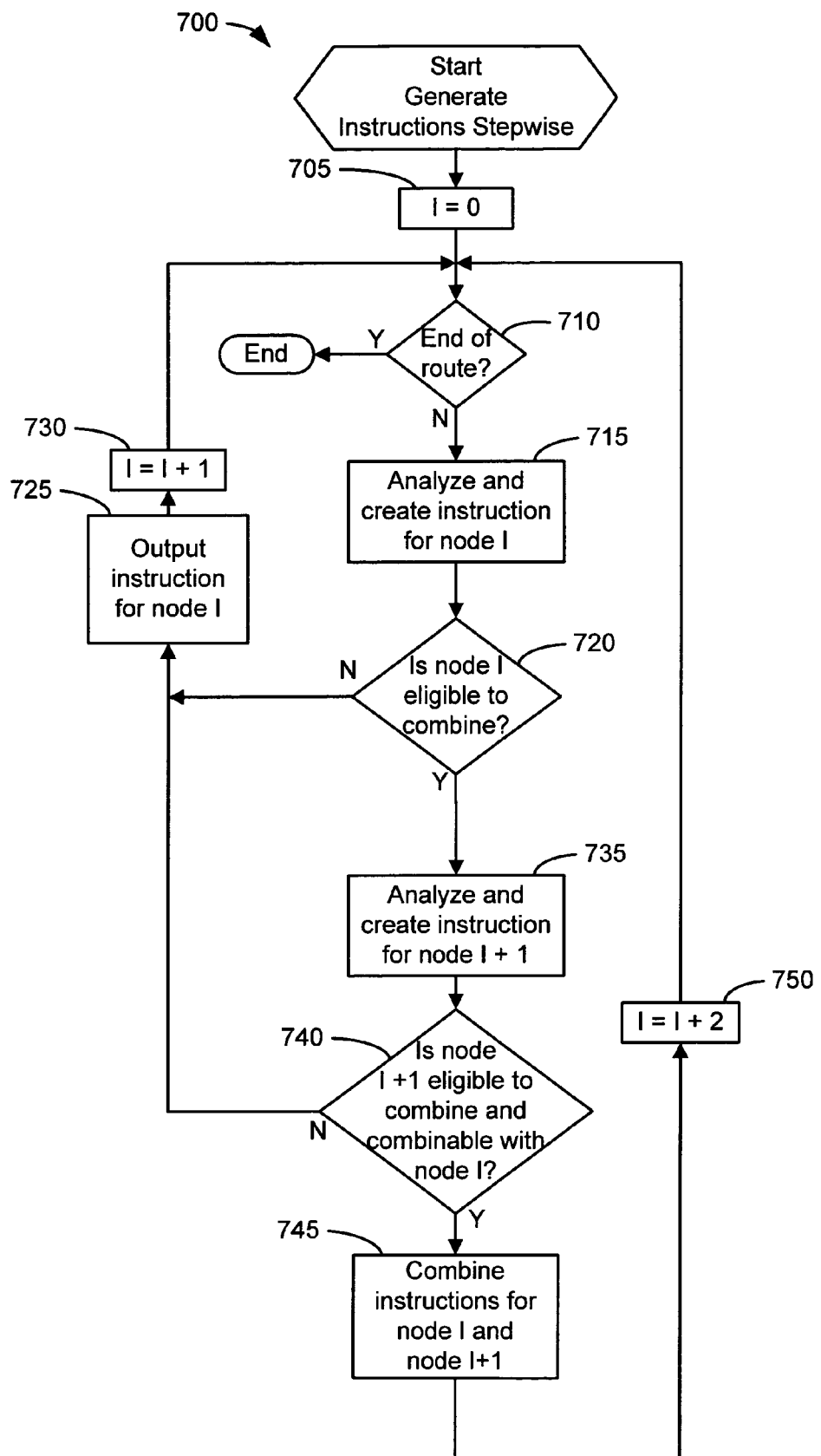
FIG. 7 is a flow chart illustrating an overview of an exemplary process for generating driving directions by processing a route in stepwise segments according to one exemplary embodiment of the present invention.

FIG. 7 is an overview of an exemplary routine 700, titled Generate Instructions Stepwise, for generating driving instructions by processing a route 200 in stepwise segments. In one embodiment of the present invention, Step 285 of Process 250, which is illustrated in FIG. 2B, engages an instruction generator module 292 to generate instructions. The instruction generator module 292 executes Routine 700 to process the route and compose an instruction set 295 for inclusion in an itinerary 297.

Beginning at the origin 204 and ending at the destination 205, Routine 700 steps through the nodes 236 on the route 200. An algorithm analyzes and creates an instruction for each node 236 and then analyzes and creates an instruction for its adjacent node. If the two nodes meet combination criteria, Routine 700 generates and outputs a combined instruction and suppresses the two separate instructions.

To best convey the pertinent information, FIG. 7 does not detail steps that are readily apparent to those skilled in the computer and mapping arts. FIG. 7 describes the flow logic and high-level analytical steps of Routine 700 and thereby enables a programmer to implement the routine 700 in software by well-know programming techniques. The analytical steps of Routine 700 generally parallel the analytical steps of Routine 293 that are illustrated in FIGS. 5–6 and described in detail above in reference to those figures.

The first step of Routine 700, initialization Step 705, sets the counter 1 equal to zero. As illustrated in FIG. 2A, the origin 204 is node zero according to the node-numbering convention. Consequently, the origin 204 is the first node 236 processed by Generate Instructions Stepwise 700.

As the first step 710 in processing each node 236, Routine 700 determines if the node 236 is the end 205 of the route 200. When Routine 700 encounters the destination node 205, the composition of a refined set 295 of driving instructions is complete, and processing terminates. In one embodiment of the present invention, an itinerary generator 296 compiles the refined set 295 of driving instructions into an itinerary 297.

If the node 236 that is undergoing current processing is not the destination 205, then Routine 700 executes Step 715. Step 715 analyzes node I 236 and generates instruction, if such an instruction is determined to be helpful to a driver. The processing steps associated with the analysis generally parallel the processing steps illustrated in FIGS. 5A–5D, as will be apparent to those skilled in the art.

After analyzing node I 236 and generating an appropriate instruction, Routine 700 executes inquiry Step 720 to determine if node I 236 is eligible to combine with another node. If node I 236 is not eligible to combine with another node, then Routine 700 executes Step 725 to output the instruction and include it in the set of instructions 295 for the route 200. Following Step 725, Routine 700 executes Step 730 to increment the node counter and step to the next node 236 along the route 200. After stepping to the next node 236, Routine 700 initiates processing that node 236.

If Step 720 determines that node I 236 is not eligible to combine, Routine 700 executes Step 735 to analyze node I+1 240 and generates its instruction. Next, Routine 700 executes inquiry Step 740 and determines if node I+1 240 is eligible to combine and is combinable with node I 236. The criteria for combining generally parallel the criteria illustrated in the flow charts for Second Pass 294 that are illustrated in FIGS. 6A–6B, as will be apparent to those skilled in the art. For example, inquiry Step 740 can apply a distance criterion to the nodes 236 to determine combinability.

If Step 720 determines that node I 236 and node I+1 240 are not combinable, then Routine 700 inserts the node-I instruction into the instruction set 295. After appending the instruction set 295, Routine 700 steps to node I+1 240 and initiates processing to determine if that node should be combined with the next node 236 in the route 200.

If inquiry Step 740 determines that node I 236 and node I+1 240 are combinable, Routine 700 executes Step 745, which combines the instructions for node I 236 and node I+1 240 and outputs the combined instruction. Following Step 745, Routine 700 executes Step 750 which increments the counter by two thereby stepping to node I+2 244. Routine 700 then continues iterating the analysis for each node 236 in the route 200. Routine 700 completes the set of refined driving instructions 295 when Step 710 detects destination node 205 and execution terminates.

CONCLUSION

In summary, the present invention supports composing or generating a set of driving directions that conform to a driver's natural driving perspective and, with clear, concise language, guide a driver to follow a route. Although composed by machine, the structure, content, and flow of the instructions emulate spoken or written human language. The present invention supports analyzing components in a route to determine a driver's natural perspective to each component. When a typical driver would correctly ignore an intervening road at an intersection, the present invention supports excluding a specific direction for that intersection from the set. When a typical driver would perceive an intersection or other route component from a certain perspective, the present invention supports generating a direction that is tailored to that perspective. When a typical driver would perceive adjacent route components as one integrated component, the present invention supports composing a single instruction that conforms to that perception. When two route components are too close to provide adequate time for a driver to absorb two instructions, the present invention supports generating a single instruction that is adapted to guide the driver through both components.

From the foregoing, it will be appreciated that the preferred embodiment of the present invention overcomes the limitations of the prior art. From the description of the preferred embodiment, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. A method for generating a set of instructions to guide a driver along a route, wherein the route comprises a first node, a second node, a third node, a first road coupled to the first node, a second road coupled between the first node and the second node, and a third road coupled between the second node and the third node, and a fourth road coupled to the third node, and wherein the method comprises the steps of:

generating a first instruction operative to guide the driver from the first road, through the first node, and onto the second road;

generating a second instruction operative to guide the driver from the second road through the second node, and onto third road; and combining the first instruction and the second instruction into a combined instruction operative to guide the driver from the first road, through the first node, through the second road, through the second node, and onto the third road wherein, based upon the configuration of the first node and the second node, the first instruction and the second instruction are combined into the combined instruction when the driver would perceive the first node and the second node as a single integrated feature of the route.

2. The method of claim 1, wherein the first instruction has a first number of words, the second instruction has a second number of words, and the combined instruction has fewer words than the sum of the first number and the second number.

3. The method of claim 1, further comprising the step of generating a third instruction operative to guide the driver from the third road, through the third node, and onto the fourth road, wherein the combining step comprises combining the first instruction, the second instruction, and the third instruction into a combined instruction operative to guide the driver from the first road, through the first node, through the second road, through the second node, though the third road, through the third node, and onto the fourth road.

4. The method of claim 1, wherein the route further comprises a series of nodes and roads, and the method further comprises the steps of:

sequentially processing each node in the series;

generating a set of instructions on the basis of the sequentially processing step;

sequentially reprocessing each node in the series; and responsive to the sequentially reprocessing step, refining the set of instructions.

5. The method of claim 4, wherein the step of generating a set of instructions comprises generating an initial set of instructions on the basis of the sequentially processing step, and wherein the refining step comprises responsive to the sequentially reprocessing step, refining the initial set of instructions to provide a refined set of instructions, and wherein the initial set of instructions has a greater number of instructions than the refined set.

6. The method of claim 1, wherein the combining step comprises if the distance between the first node and the second node is less than a threshold, combining the first instruction and the second instruction into a combined instruction operative to guide the driver from the first road, through the first node, through the second road, through the second node, and onto the third road.

7. The method of claim 1, further comprising the step of generating a driving itinerary that comprises the combined instruction.

* * * * *